(12) United States Patent
Prentice et al.

(10) Patent No.: US 11,923,801 B2
(45) Date of Patent: Mar. 5, 2024

(54) SYSTEM AND METHOD FOR MOBILE SOLAR GENERATORS

(71) Applicant: Halcyon Energy Systems, LLC, San Luis Obispo, CA (US)

(72) Inventors: Russell A. Prentice, Arroyo Grande, CA (US); David J. McMillan, San Luis Obispo, CA (US)

(73) Assignee: Halcyon Energy Systems, LLC, San Luis Obispo, CA (US)

(*) Notice: Subject to any disclaimer, the term of this patent is extended or adjusted under 35 U.S.C. 154(b) by 0 days.

(21) Appl. No.: 17/944,046

(22) Filed: Sep. 13, 2022

(65) Prior Publication Data

US 2023/0081734 A1 Mar. 16, 2023

Related U.S. Application Data

(60) Provisional application No. 63/244,653, filed on Sep. 15, 2021.

(51) Int. Cl.
*H02S 20/30* (2014.01)
*B65D 88/12* (2006.01)
(Continued)

(52) U.S. Cl.
CPC ............ *H02S 20/30* (2014.12); *B65D 88/121* (2013.01); *B65D 90/0026* (2013.01); *H02S 30/10* (2014.12); *H02S 30/20* (2014.12)

(58) Field of Classification Search
CPC .......... H02S 20/30; H02S 30/10; H02S 30/20; B65D 88/121
See application file for complete search history.

(56) References Cited

U.S. PATENT DOCUMENTS

| 4,155,524 A | 5/1979 | Marello et al. |
| 4,315,163 A | 2/1982 | Bienville |

(Continued)

FOREIGN PATENT DOCUMENTS

| CN | 105375862 A | 3/2016 |
| CN | 105656408 | * 6/2016 |

(Continued)

OTHER PUBLICATIONS

Marketing Fastenright, "Preventing the Theft of Solar Panels", https://www.fastenright.com/blog/preventing-the-theft-of-solar-panels, 2019, All Pages (Year: 2019).

(Continued)

*Primary Examiner* — Jayne L Mershon
(74) *Attorney, Agent, or Firm* — Knobbe Martens Olson & Bear LLP

(57) ABSTRACT

Features for a solar generation system. The system includes a solar generator that may be installed on a shipping container. The solar generator includes one or more deployable rotating solar arrays. The rotating solar arrays may be deployed and stowed using actuators. The rotating solar arrays may be stowed for transport of the system on ships or to remote locations. The solar panels of the array are unexposed when stowed. A base frame with corner castings may attach to standard connections on cargo containers. The solar generators may be stacked on top of each other when stowed for transport. An actuation system may include linear actuators with two arms connecting at a moving pivot point that attach to a base frame and to the panels for deployment. Another actuation system may include end-mounted linear actuation arms with panel backside-mounted deployment arms.

20 Claims, 21 Drawing Sheets

(51) Int. Cl.
  *B65D 90/00* (2006.01)
  *H02S 30/10* (2014.01)
  *H02S 30/20* (2014.01)

(56) References Cited

U.S. PATENT DOCUMENTS

| | | | |
|---|---|---|---|
| 5,111,127 | A | 5/1992 | Johnson |
| 5,233,227 | A | 8/1993 | Kajimoto et al. |
| 5,522,943 | A | 7/1996 | Spencer et al. |
| 5,969,501 | A | 10/1999 | Glidden et al. |
| 6,111,391 | A | 8/2000 | Cullen |
| 6,201,181 | B1 | 3/2001 | Azzam et al. |
| 6,396,239 | B1 | 5/2002 | Benn et al. |
| 6,563,040 | B2 | 3/2003 | Hayden et al. |
| 6,914,418 | B2 | 7/2005 | Sung |
| 7,230,819 | B2 | 6/2007 | Muchow et al. |
| 7,469,541 | B1 | 12/2008 | Melton et al. |
| 7,795,837 | B1 | 9/2010 | Haun et al. |
| 8,254,090 | B2 | 8/2012 | Prax et al. |
| 8,295,033 | B2 | 10/2012 | Van Straten |
| 8,492,645 | B1 | 7/2013 | Strahm |
| 8,839,574 | B1 * | 9/2014 | Gill .................. H02S 20/20 52/173.3 |
| 9,246,035 | B2 | 1/2016 | Eaton, Jr. |
| 10,371,328 | B2 | 8/2019 | Poage |
| 2005/0218657 | A1 | 10/2005 | Weesner et al. |
| 2006/0137348 | A1 | 6/2006 | Pas |
| 2009/0079161 | A1 | 3/2009 | Muchow et al. |
| 2010/0109601 | A1 | 5/2010 | Coyle et al. |
| 2010/0207452 | A1 | 8/2010 | Saab |
| 2011/0132353 | A1 | 6/2011 | Gumm et al. |
| 2011/0176256 | A1 | 7/2011 | Straten |
| 2012/0025750 | A1 | 2/2012 | Margo |
| 2012/0042936 | A1 | 2/2012 | Feichtinger et al. |
| 2012/0313569 | A1 | 12/2012 | Curran |
| 2013/0037082 | A1 * | 2/2013 | Grant .................. H02S 30/20 136/246 |
| 2013/0039104 | A1 | 2/2013 | Sharma |
| 2013/0082637 | A1 | 4/2013 | Eaton et al. |
| 2013/0234645 | A1 | 9/2013 | Goei et al. |
| 2013/0340807 | A1 | 12/2013 | Gerwing et al. |
| 2015/0090315 | A1 | 4/2015 | Spisak |
| 2015/0013750 | A1 | 5/2015 | Meppelink et al. |
| 2015/0349699 | A1 | 12/2015 | Chambe et al. |
| 2016/0241036 | A1 | 8/2016 | Wolter |
| 2016/0285404 | A1 | 9/2016 | Aikens et al. |
| 2018/0076757 | A1 | 3/2018 | Gross et al. |
| 2018/0254740 | A1 | 9/2018 | Corio |
| 2019/0267929 | A1 * | 8/2019 | Carrington ........... H02S 20/30 |

FOREIGN PATENT DOCUMENTS

| | | | |
|---|---|---|---|
| CN | 105656408 | | 3/2018 |
| CN | 109921721 | A | 6/2019 |
| CN | 209441502 | | 9/2019 |
| DE | 10143308 | | 3/2003 |
| DE | 202015102514 | * | 6/2015 |
| DE | 202015102514 | | 7/2015 |
| JP | 3169441 | U | 7/2011 |
| WO | WO 2007/039732 | A2 | 4/2007 |
| WO | WO 2014/096945 | A2 | 6/2014 |
| WO | WO 2016/059582 | A1 | 4/2016 |
| WO | WO 2016/073013 | A1 | 5/2016 |
| WO | WO 2016/091711 | A1 | 6/2016 |
| WO | WO 2017/165913 | A1 | 10/2017 |
| WO | WO 2018/109524 | A1 | 6/2018 |
| WO | WO 2018/209378 | | 11/2018 |

OTHER PUBLICATIONS

International Search Report and Written Opinion for PCT/US2021/021530, dated May 25, 2021.

International Search Report and Written Opinion for PCT/US2022/076375, dated Nov. 25, 2022.

\* cited by examiner

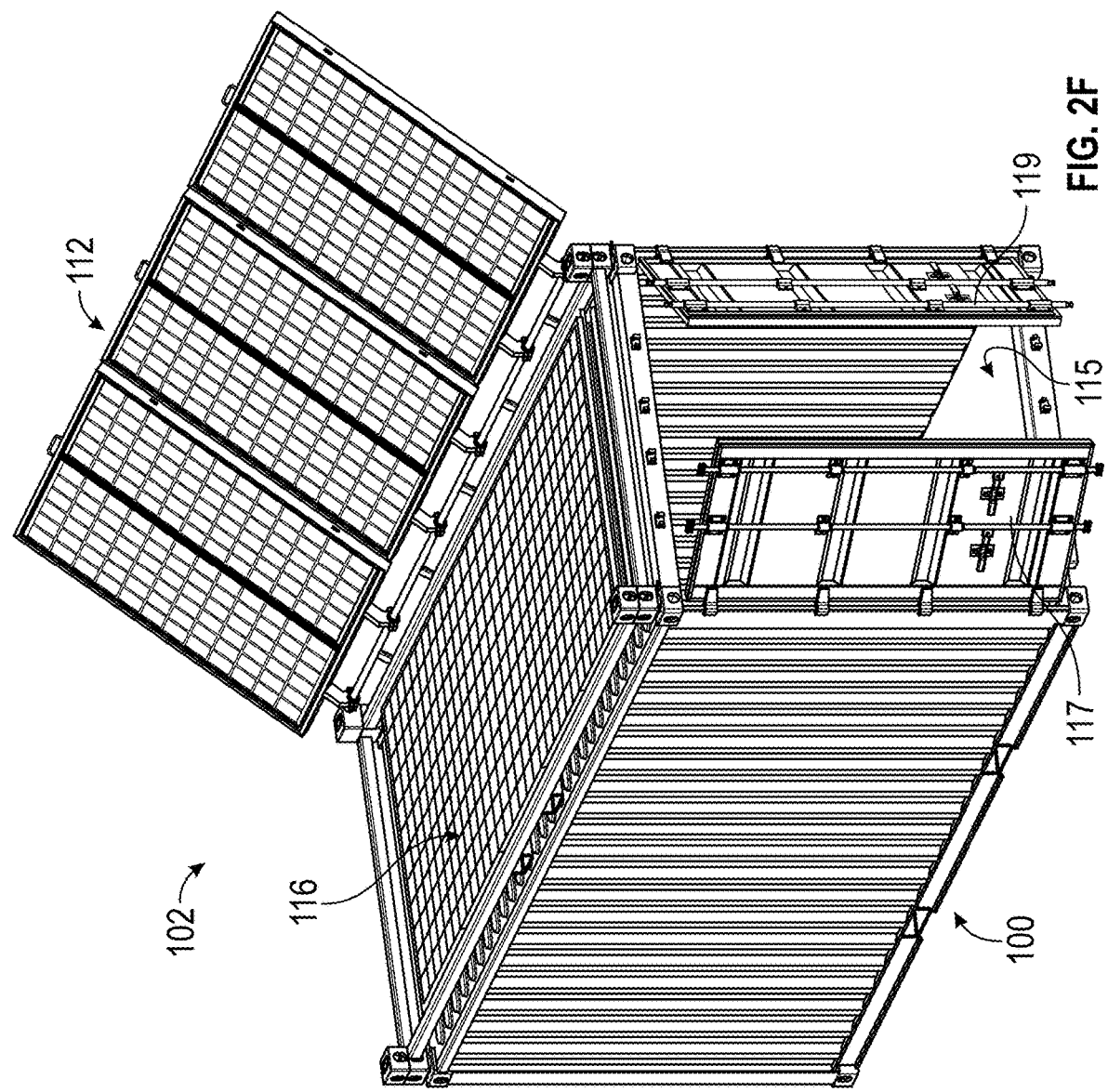

SYSTEM AND METHOD FOR MOBILE SOLAR GENERATORS

TECHNICAL FIELD

The development relates to power generation, in particular to systems and methods for mobile solar-powered generators or "solar generators."

BACKGROUND

Providing power to cargo containers and other systems and to remote locations, such as on cargo ships or trucks or in rural areas, may enable life-sustaining and other vital systems. However, containers in transit and many remote areas are without access to a standard energy grid and the power that comes from it. Further, it is expensive to run power lines from energy production facilities to remote fixed locations. There is therefore a need to provide power for containers and other systems in transit and for remote locations.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for mobile solar power systems.

This section of the disclosure describes non-limiting examples of some embodiments. Other embodiments of the disclosed systems and methods may or may not include the features described herein. Moreover, disclosed advantages and benefits may apply only to certain embodiments and should not be used to limit the disclosure. The innovations described throughout this disclosure may be embodied or carried out in a manner that achieves or optimizes one advantage or group of advantages as taught herein without necessarily achieving other advantages as may be taught or suggested herein. Any of the below aspects may be combined with each other as suitable, and/or with any of the other features described in any of the sections herein. The present disclosure contemplates combining one or more features of each of the aspects in each and every suitable combination.

Described herein are features for mobile solar-powered generators or "solar generators" that may be used with cargo containers and other systems. The solar generators may also be used in fixed locations, e.g., that are remote from dedicated power systems. The technology provides the necessary levels of efficient, sustained power supply along with the required safety and security needed for cargo containers and in remote locations. The system is modular and may be dimensioned and configured to connect to standard shipping and cargo containers. Corner castings may be designed and located to attach to standard sized containers and fittings. Multiple units of the system may be stacked together for compact and efficient transport. Some embodiments of the system may be deployed manually and/or with actuation systems. The actuation systems may be used to deploy the systems and then removed from the solar array and container to save space. There may be one or more deployable solar panels using one or more hinges with specially designed tube hinge components. Some embodiments of the actuation system use a moving pivot point for ease of deployment and economy of space. Some embodiments of the deployment system use end-mounted extendable and/or rotatable arms.

In one aspect, a solar generation system according to this disclosure can be configured for attaching to a cargo container. The system includes a base frame, four corner castings, one or more hinge tubes, and one or more panel support frames. The base frame is configured to extend over a top of the cargo container. Each of the four corner castings is configured to couple the base frame to the container at a respective standard connection at each of four corners of the cargo container via a twist lock connection. The one or more hinge tubes is attached with the base frame. The one or more panel support frames are rotatably coupled to the base frame via the one or more hinge tubes, each panel support frame comprising one or more solar panels configured to be unexposed to sunlight with the panel support frame in a stowed configuration and exposed to sunlight with the panel support frame in a deployed configuration.

A variation to the aspect above further comprises an enclosure coupled to the base frame and comprising electronics electrically connected with the solar panels.

A variation to the aspect above is, wherein the corner castings comprise four upper corner castings disposed above four lower corner castings.

A variation to the aspect above is, wherein the base frame is configured to support thereon a second base frame or a second cargo container by securing through the corner castings of the base frame with twist lock connectors.

A variation to the aspect above further comprises one or more actuators configured to rotate the one or more panel support frames about the one of the one or more hinge tubes to the deployed configuration.

A variation to the aspect above is, wherein the one or more panel support frames are configured to lie flat on top of the base frame in the stowed configuration.

A variation to the aspect above is, wherein at least one of the one or more panel support frames are configured to rotate from the stowed configuration to the deployed configuration about an angle in the range of 90-270 degrees.

A variation to the aspect above is, wherein the cargo container is a standard intermodal shipping container.

A variation to the aspect above is, wherein the base frame may be configured to have a length that matches a length of the standard intermodal shipping containers, wherein the standard shipping container has a length of between 10 feet and 40 feet.

A variation to the aspect above is, wherein an overall height of the system in the stowed configuration is no greater than 12 inches.

A variation to the aspect above further comprises the cargo container, and wherein the base frame is attached to the top of the cargo container.

Another aspect is a solar generation system configured for attaching to a cargo container, the system including a base frame and one or more actuation assemblies. The base frame is configured to extend over a top of the cargo container and configured to support one or more solar arrays. The base frame includes one or more hinge tubes, the one or more rotating solar arrays rotatably coupled to the base frame via the one or more hinge tubes. Each individual rotating solar array is configured to rotate about one of the one or more hinge tubes between a stowed position and a deployed position. The one or more stationary solar arrays are configured to lie flat on top of the base frame when in the stowed position. At least one of the one or more solar panels of the one or more solar arrays are exposed to sunlight when in the deployed position. The one or more actuation assemblies is configured to attach to the base frame and to extend along a side of the container, the one or more actuation assemblies configured to rotate the one or more rotating solar arrays between the deployed position and the stowed position. Each actuation assembly includes an actuator arm and a lever arm. The actuator arm is configured to extend linearly. The lever arm is connected to the actuator arm at a pivot point at a first end and attached to one or more of the one or more rotating solar arrays at a second end, wherein the pivot point moves linearly in response to linear extension of the actuator arm.

A variation of the aspect above is, wherein, to rotate one of the one or more rotating solar arrays from the stowed position to an initial angular position, the actuator is configured to apply an upward force on the one of the one or more rotating solar arrays through the lever arm. Further, to rotate the one of the one or more rotating solar arrays from the initial angular position to the deployed position, the actuator is configured to apply a downward force on the one of the one or more rotating solar arrays through the lever arm.

A variation of the aspect above is, wherein at least one of the one or more solar arrays lie flat on top of the base frame in the deployed position.

A variation of the aspect above is, wherein the cargo container is a standard intermodal shipping container.

A variation of the aspect above is, wherein the base frame has a length that matches a length of the standard intermodal shipping containers, wherein the standard shipping containers may have a length of from about 10 feet to 40 feet.

A variation of the aspect above is, wherein an overall height of the base frame and the solar arrays in the stowed position is not greater than 12 inches.

Another aspect is a method of deploying a solar generation system on a cargo container. The method includes mounting one or more solar arrays comprising one or more solar panels on top of the cargo container, and positioning the one or more solar arrays flat above the container in a stowed configuration. The method further includes rotating one or more of the one or more rotating solar arrays from the stowed configuration to a deployed configuration via rotation of a lever arm attached to the one or more rotating solar arrays. Further, the method includes linearly moving a pivot point of the lever arm.

A variation of the aspect above further comprises mounting another cargo container on top of the mobile solar generation system.

A variation of the aspect above further comprises attaching the solar generator to standard connections of the cargo container via corner castings.

In another aspect, a plurality of any of the solar generation systems described herein are stacked in stowed configurations on top of each other and connected at respective corner castings of each system.

Any of the above or other aspects herein may include one, some or all of the following features: hinge mounts comprising first and second opposing mating parts attached together about the hinge tube to form an opening between the parts to receive the hinge tube therethrough; an upward extending arm from the hinge mount to the side of the panel frame; a downward extending arm from the hinge mount to the side of the panel frame; a first hinge mount laterally offset from a second hinge mount, each mount attached to the hinge tube and to respective first and second panel frames via respective upward and downward extending arms, wherein the first and second mounts are identically manufacture parts flipped over to connect with first and second panel frames vertically stacked on top of each other in a stowed configuration; a linear actuator configured to extend and retract a shaft that is rotatably attached to a lever arm at a pivot point, the lever arm attached to the panel frame at an opposite end, wherein the pivot point translates as the shaft translates and the lever arm rotates to cause deployment and stowing of the panel frames; the linear actuator mounted to a long side of the base frame and extending downward along a side of the cargo container; corner castings having three pairs of opposing faces, with one or more first faces defining a first opening configured to receive therethrough a lock to connect with another corner casting, and one or more second faces that is oriented perpendicularly to the one or more first faces defining a second opening configured to receive therethrough a hinge tube or fitting for a hinge tube, or a base frame member or a fitting for a base frame member, to support respectively the hinge tube or base frame member between opposing corner castings at opposite ends of respectively the hinge tube or base frame member; and/or the actuation system may be temporality attached and then removed.

BRIEF DESCRIPTION OF THE DRAWINGS

The foregoing and other features of the present disclosure will become more fully apparent from the following description and appended claims, taken in conjunction with the accompanying drawings. In the following detailed description, reference is made to the accompanying drawings, which form a part hereof. Understanding that these drawings depict only several embodiments in accordance with the disclosure and are not to be considered limiting of its scope, the disclosure will be described with additional specificity and detail through use of the drawings. In the drawings, similar symbols typically identify similar components, unless context dictates otherwise. It will be understood that elements illustrated in the figures are not necessarily drawn to scale. Further, the illustrative embodiments described in the detailed description, drawings, and claims are not meant to be limiting. The aspects of the present disclosure, as generally described herein, and illustrated in the drawings, may be arranged, substituted, combined, and designed in a wide variety of different configurations, all of which are explicitly contemplated and make part of this disclosure. Other embodiments may be utilized, and other changes may be made, without departing from the spirit or scope of the subject matter presented here. For example, it will be understood that certain embodiments may include more elements than illustrated in a drawing and/or a subset of the elements illustrated in a drawing. As another example, some embodiments may incorporate any suitable combination of features from two or more drawings.

FIG. 2F is a perspective view of the solar generation system of FIG. 2D shown deployed.

DETAILED DESCRIPTION

The following detailed description is directed to certain specific embodiments of the development. Reference in this specification to "one embodiment," "an embodiment," "in some embodiments," or similar phrases, means that a particular feature, structure, or characteristic described in connection with the embodiment is included in at least one embodiment of the invention. The appearances of such phrases in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

Figure 1A:
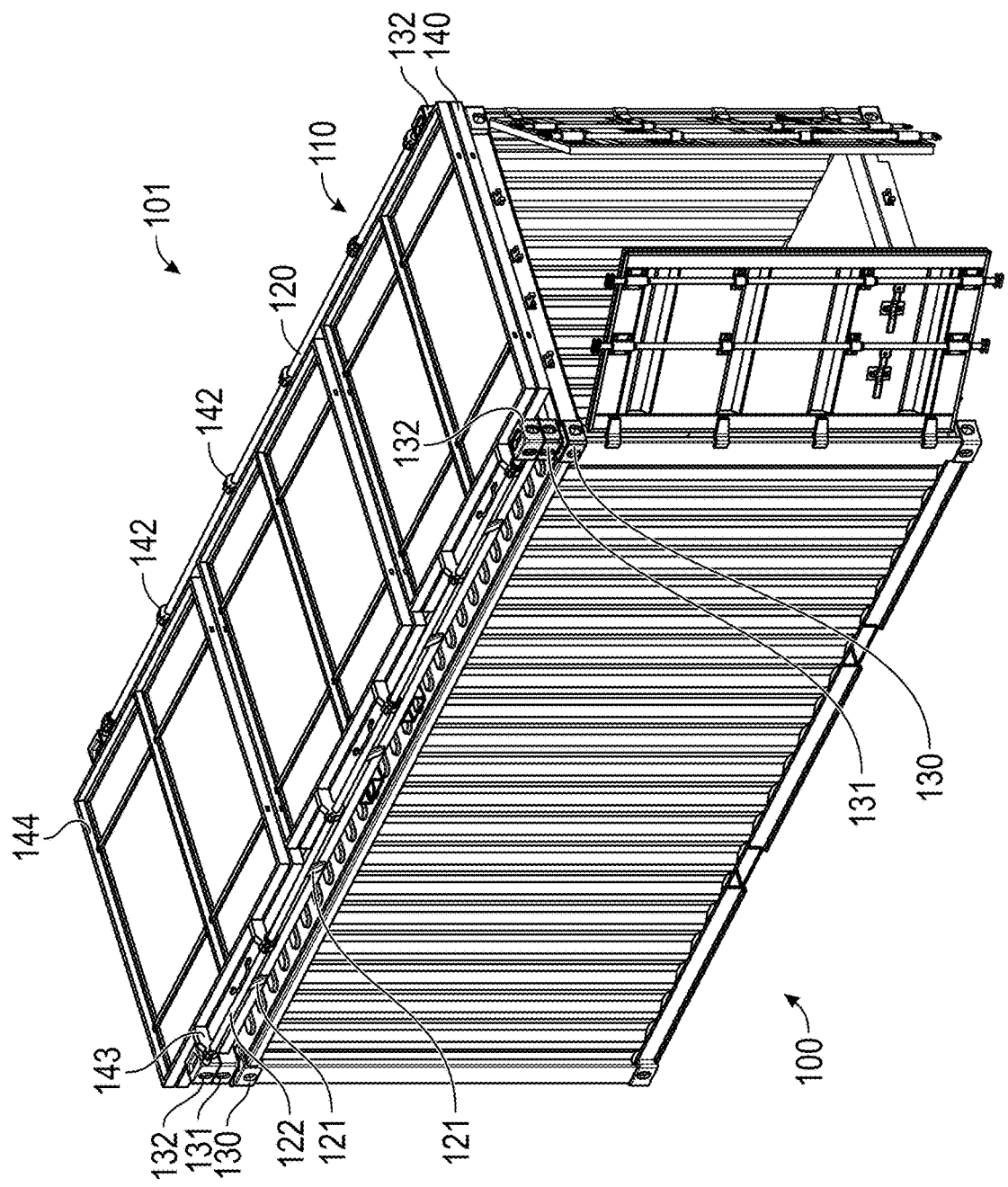
FIG. 1A is a perspective view of an embodiment of a solar generation system having two deployable solar arrays and in a stowed configuration on top of a cargo container.

FIG. 1A is a perspective view of an example embodiment of a solar generation system 101 attached to a container 100. It is merely one of various embodiments of solar power generation systems described herein. Any features of any solar generation system described herein may be applied to any other solar generation system, except as otherwise described. In certain embodiments, the solar generation system 101 is designed to supply power to either off-grid or grid-tied systems. Power may be provided by the solar generator, which may be mobile or otherwise easily transported.

The solar generation system 101 may be mounted on top of a standard intermodal shipping container, for ease of transport, and unfold to provide power when needed. The solar generation system 101 may have length and width dimensions that generally match that of standard containers, while having a low profile or height to save space, e.g., no greater than 12" (inches). A standard intermodal shipping container may typically have length, width and height dimensions respectively of 9'9.75" (nine feet, nine and three quarter inches)×8' (eight feet)×8'6" (eight feet, six inches) (e.g., a "10-foot container"), or 19'10.5"×8'×8'6" (e.g., a "20-foot container"), or 40'×8'×8'6" (e.g., a "40-foot container"). An empty standard intermodal shipping container may typically have a weight of 2,850 lbs. (pounds) (e.g., a 10-foot container), 5,050 lbs. (e.g., a 20-foot container), and 8,000 lbs. (e.g., a 40-foot container). Generated solar energy may be used to power equipment inside the container 100, an office inside the container, agricultural equipment, refrigeration equipment (particularly on refrigerated shipping containers called "reefers"), water pumping equipment, and homes. The systems may also provide power for a vehicle charging station when stationary.

The solar generation system 101 may include solar panels and be mounted on a standard shipping container using a base frame 110 and standard corner castings. The standard corner castings may be the same as corner castings typically found on all eight corners of a standard shipping container. The corner castings each have three holes, one in each side of the outward facing surfaces of the casting which allows other shipping containers or external equipment to be securely affixed to the container. In some embodiments, the base frame 110 of the solar generation system 101 according to the present disclosure may include steel members welded to corner castings that attach to the standard corner castings of typical cargo containers. The solar panels may be mounted on panel support frames that are rotatably connected with a base frame via hinges. The panel support frames and the base frame 110 may be made of any desirable materials (e.g., aluminum, steel, etc.). The base frame 110 may be constructed to have a length that matches lengths of standard intermodal shipping containers (e.g., 10 ft, 20 ft, or 40 ft) or lengths of other types of containers as needed.

Figure 1B:
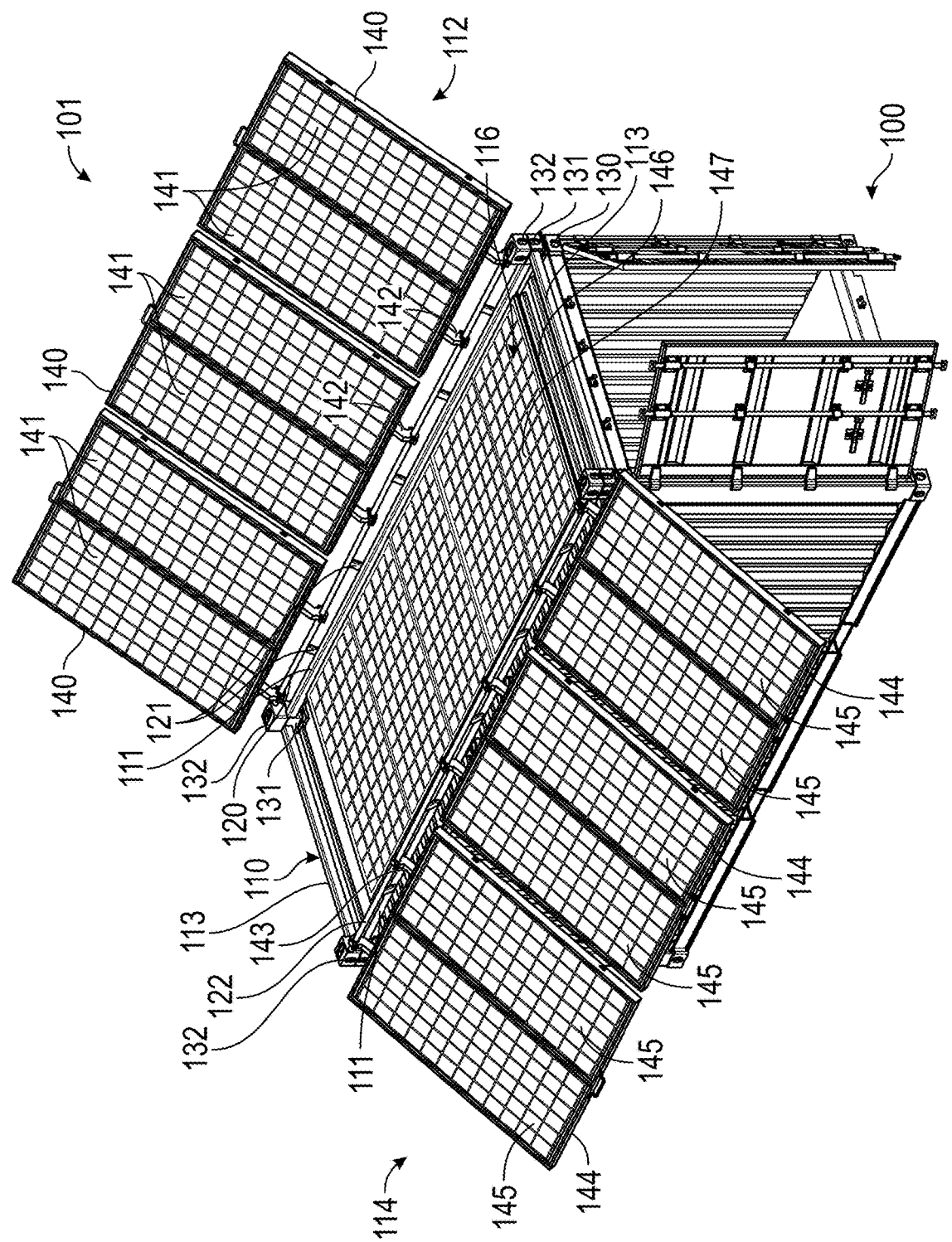
FIG. 1B is a perspective view of the solar generation system in FIG. 1A in a deployed configuration.

As shown in FIGS. 1A-1B, the solar generation system 101 is attached to the container 100. The base frame 110 may be mounted on the container 100 along one or more top edges of the container 100. The base frame 110 may include one or more hinge tubes 120 connected to the base frame 110 through a plurality of hinge arms 121. The base frame 110 may also include a plurality of lower corner castings 131 and a plurality of upper corner castings 132. In some embodiments, the one or more hinge tubes 120, 122 may be secured to the container 100 through the plurality of upper corner castings 132, with one corner casting 132 on each end of the respective hinge tube 120, 122. The plurality of upper corner castings 132 may be mounted on top of and/or connected to the set of lower corner castings 131.

In some embodiments, the base frame 110 may be mounted on the container 100 through the lower corner castings 131 and standard corner castings 130 of the container 100. The lower corner castings 131 of the base frame 110 may be connected to the corner castings 130 of the container 100. In some embodiments, the lower corner castings 131 of the base frame 110 may be secured to the corner castings 130 of the container 100 with a twist lock connector 133 as shown in and described in further detail with respect to FIGS. 3A-3C.

As further shown in FIGS. 1A and 1B, the system 101 may further include one or more rotating solar arrays 112, 114 mounted to the base frame 110. Each rotating solar array 112, 114 may include one or more panel frames 140, 144 and one or more solar panels 141, 145. In some embodiments, the one or more rotating solar arrays 112, 114 may be mounted to the base frame 110.

For example, as shown in FIG. 1B, the two rotating solar arrays 112, 114 and one stationary solar array 116 are mounted to the base frame 110, with the first rotating solar array 112 and the second rotating solar array 114 mounted to the base frame 110 at opposite hinges. The third stationary solar array 116 may be positioned and/or secured on top of the base frame 110 above the container 100. The first rotating solar array 112 may include panel frames 140 and solar panels 141. The second rotating solar array 114 may include panel frames 144 and solar panels 145. The third stationary solar array 116 may include panel frames 146 and solar panels 147. In some embodiments, the first rotating solar array 112 may be mounted to the hinge tube 120 of the base frame 110 through hinge mounts 142. The second rotating solar array 114 may be mounted to the hinge tube 122 of the base frame 110 through second hinge mounts 143 located opposite the first hinge mounts 142. As shown, the first solar array 112 may include three panel frames 140 and six solar panels 141. The second solar array 114 may include three panel frames 144 and six solar panels 145. The third solar array 116 may include a single panel frame 146 and five solar panels 147 (for clarity, only some are labelled in FIG. 1B). There may be any number of the various panel frames and solar panels for any of the solar arrays.

Further, the hinge tubes 120, 122 may be located opposite each other and at the same vertical heights. The first hinge tube 120 rotatably attached to the first solar array 112 may extend axially and parallel to the second hinge tube 122 that is rotatably attached to the second solar array 114. The hinge tubes 120, 122 may define respective rotational axes that are coplanar and extend parallel to each other. Each hinge tube 120, 122 may be a single, continuous elongated tube, which may be hollow or solid. Or each hinge tube 120, 122 may be formed of shorter, discrete tube portions that make up the entire length of the tube. The hinge mounts 142 and 143 of the rotating solar arrays 112 and 114 may be angled and attached to the panel frames at a point such that the stacked solar arrays are parallel when stowed even when hinge tubes 120 and 122 are at the same vertical height. This allows the panel frames to lie flat on top of the base frame in the stowed configuration. Thus, in some embodiments, in the stowed configuration, the solar arrays 112, 114 may be at different vertical heights, while the respective hinge tubes 120, 122 of each solar array 112, 114 may be coplanar or at the same vertical height.

The first hinge tube 120 may connect to two respective first and second upper corner castings 132, and the second hinge tube 122 may connect to two respective third and fourth upper corner castings 132 that are opposite to and at the same height as the first and second corner castings 132. In this manner, when stowed, the upward-facing faces of the upper corner castings 132 may define a planar upper surface allowing for a second system 101 to be stacked on top of a first system 101. Additional systems 101 may then be stacked on top of the second system 101, and so forth, to create a stack of the systems 101. The lower corner castings 131 of an upper system 101 may mount on top of the upper corner castings 132 of a lower system 101, and so forth. Such stack may allow for easy transport on semi-truck beds, on ships, in storage, or in other applications. Further, the lower corner castings 131 of the bottom system 101 in such a stack may attach to standard connections or castings found on standard container transport trailers, etc. The corner castings in such stacks may be connected together using the twist lock connection described herein or other suitable means, such as an elongated connector extending vertically through a respective corner in each vertically-stacked corner casting in the stack.

Figure 2A:
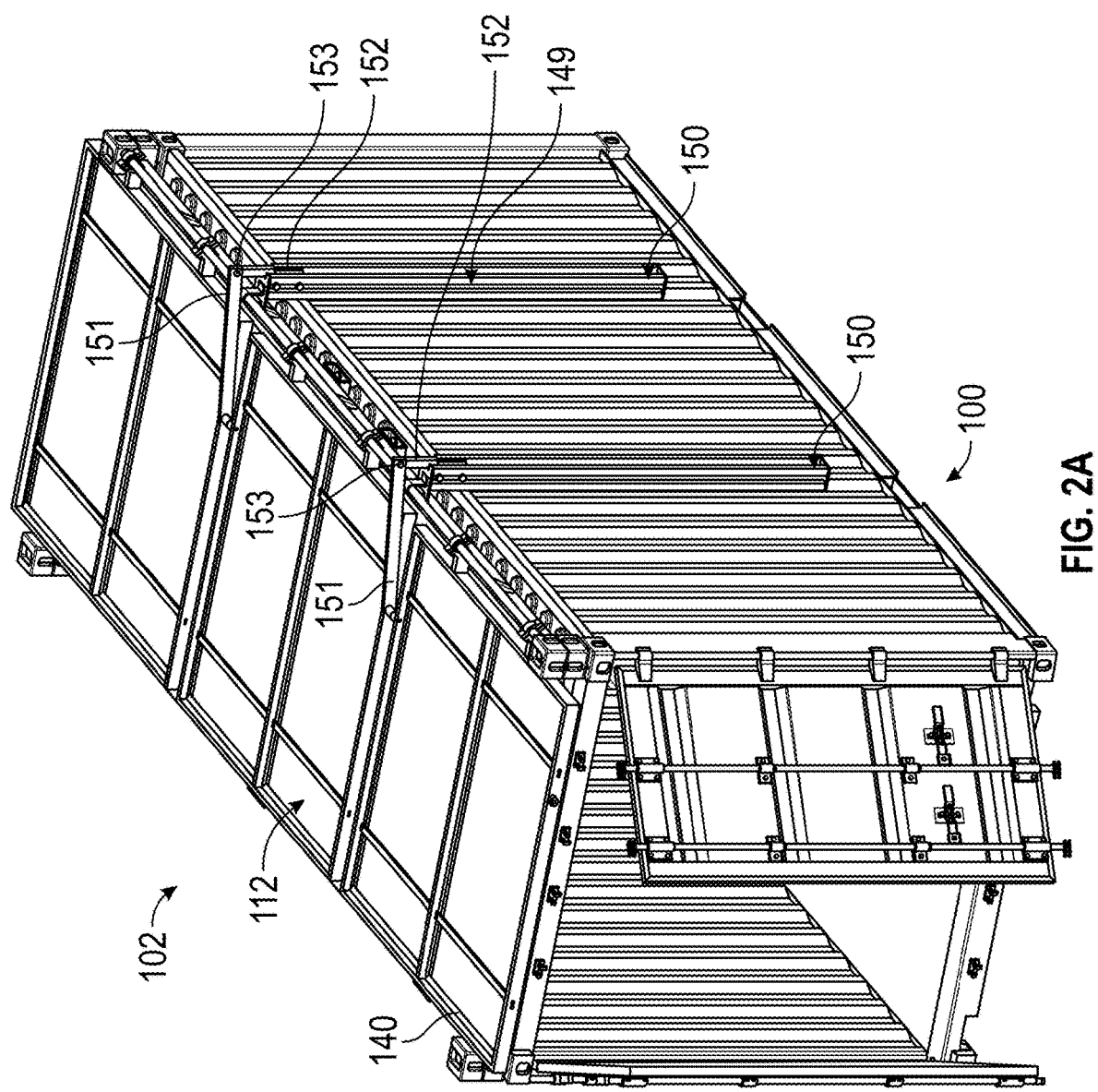
FIG. 2A is a perspective view of another embodiment of a solar generation system having a single deployable solar array in a stowed configuration on top of a cargo container with a movable pivot point actuation system.
Figure 2B:
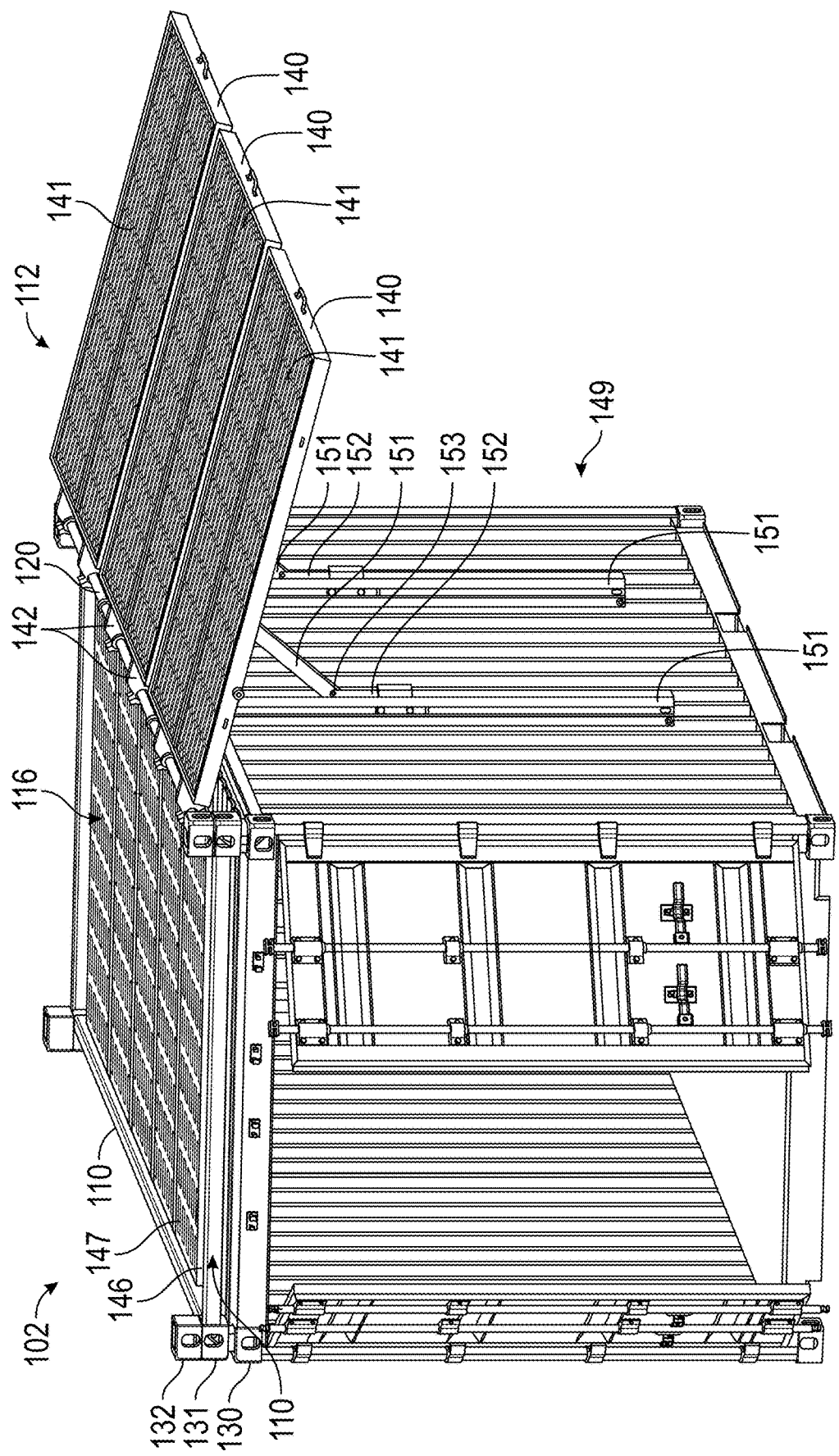
FIG. 2B is a perspective view of the solar generation system in FIG. 2A in a deployed configuration.

The mobile solar generation systems described herein may be in a stowed configuration (see, e.g., FIGS. 1A and 2A) and deploy into a deployed configuration (see, e.g., FIGS. 1B and 2B). The system 101 may be deployed and stowed manually, for example by hand or using a tool such as a crowbar or other elongated device to grab or push the panel frames open. The system 101 may also be deployed and stowed manually by use of external tools such as a forklift, or mechanical cable winch to pull the panel frames open. In some embodiments, the system 101 may be deployed and/or stowed using an actuation system, such as those described in FIGS. 2A-2C and elsewhere herein. The actuation systems may be temporarily attached to the solar generation systems, which may then be deployed, and then the actuation system may be removed. A similar process may be used to stow the panel frames. In some embodiments, the actuation system may remain on the solar generation system while the panel frames are deployed and the system is generating solar power.

In some embodiments, in the stowed configuration, the panel frames 140 and 144 may be folded towards the panel frames 146 such that the solar panels 141, 145, and 147 may be unexposed to sunlight. In some embodiments, the panel frames 140, 144, and 146 in the stowed configuration may be locked into place by mechanical means to prevent tampering, theft, and vandalism. For example, openings in the panel frames 140, 144 may be used to secure a lock or other mechanism. In the deployed configuration, the panel frames 140 and 144 may be opened towards the sides of the container 100 such that the solar panels 141, 145, and 147 may face outwardly to be exposed to sunlight. In some embodiments, the panel frames 140 and 144 in the deployed configuration may be locked into place by mechanical means to avoid inadvertent closing or excessive vibration from the environment (e.g., weather, road conditions, waves, etc.).

The base frame 110 may include four elongated members, with two members 111 extending along the longer length of the container 100 and two members 113 extending along the shorter lengths of the container 100. The members 111, 113 may form a rectangle. The members 111, 113 may connect at each respective end thereof to one of the lower corner castings 131. A first lateral-facing side of the corner casting 131 may connect to a first end of the member 111, and a second lateral-facing side of the corner casting 131 rotated ninety degrees from the first lateral-facing side may connect to a perpendicularly oriented member 113. The members 111, 113 may have four-side cross-sectional profiles, such as square or rectangular, and may be hollow or solid. The base frame 110 members may be metallic such as steel or aluminum, or other suitable materials.

Figure 2C:
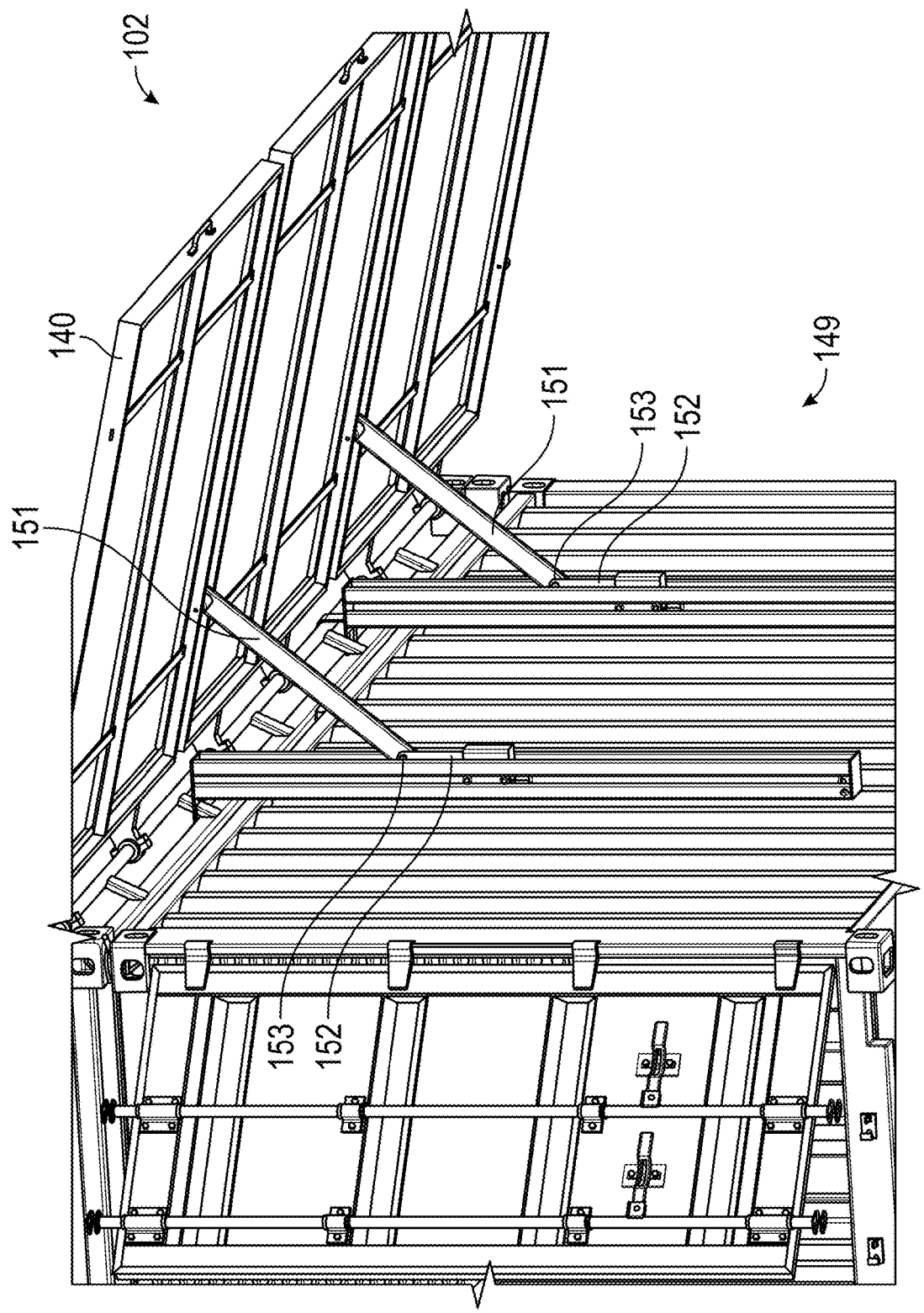
FIG. 2C is a close-up perspective view of the solar generation system in FIG. 2B showing the actuation system with a movable pivot point.
Figure 2D:
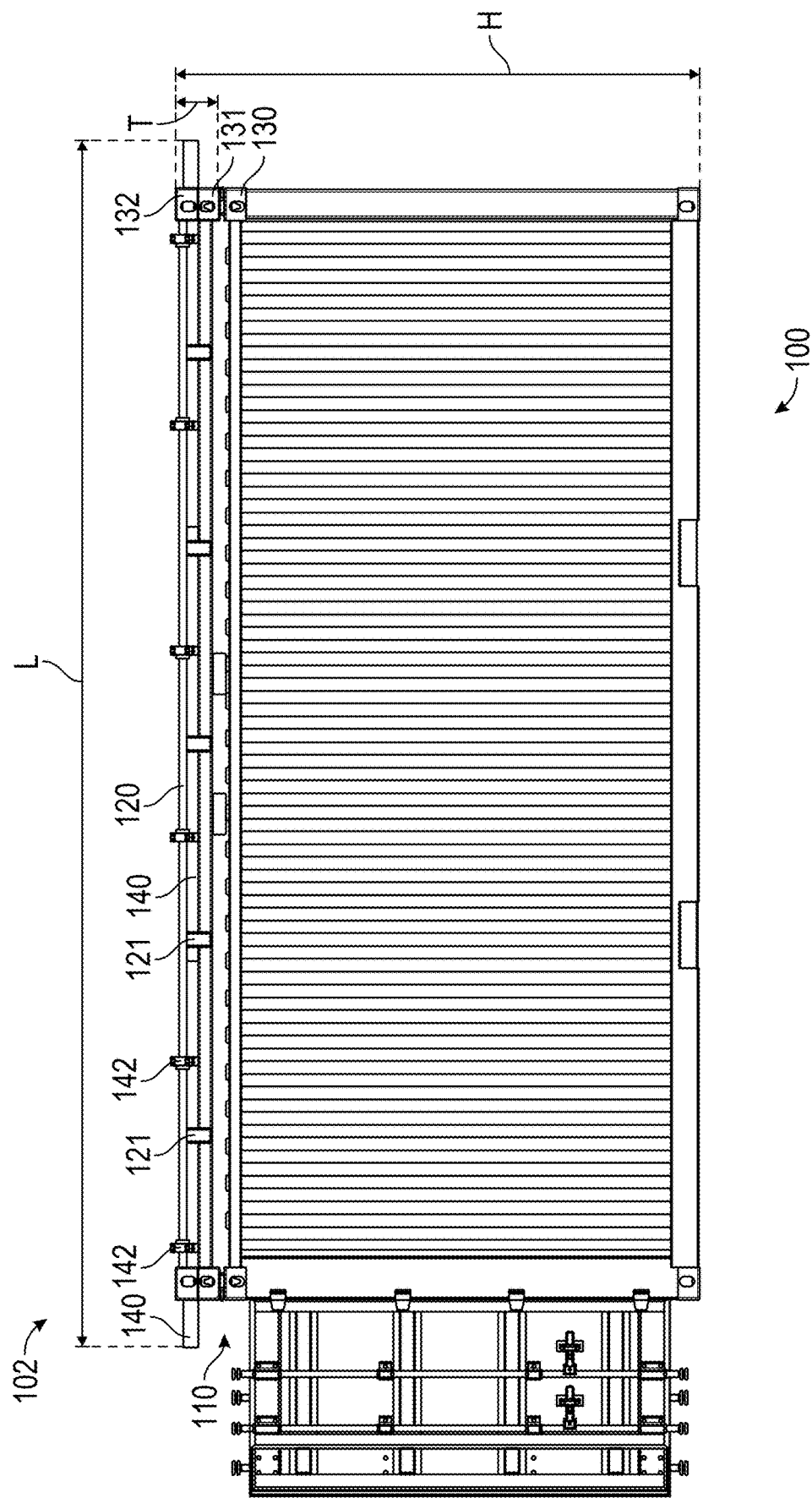
FIG. 2D is a side view of an embodiment of a solar generation system having a single deployable solar array in a stowed configuration and shown without an actuation system.
Figure 2E:
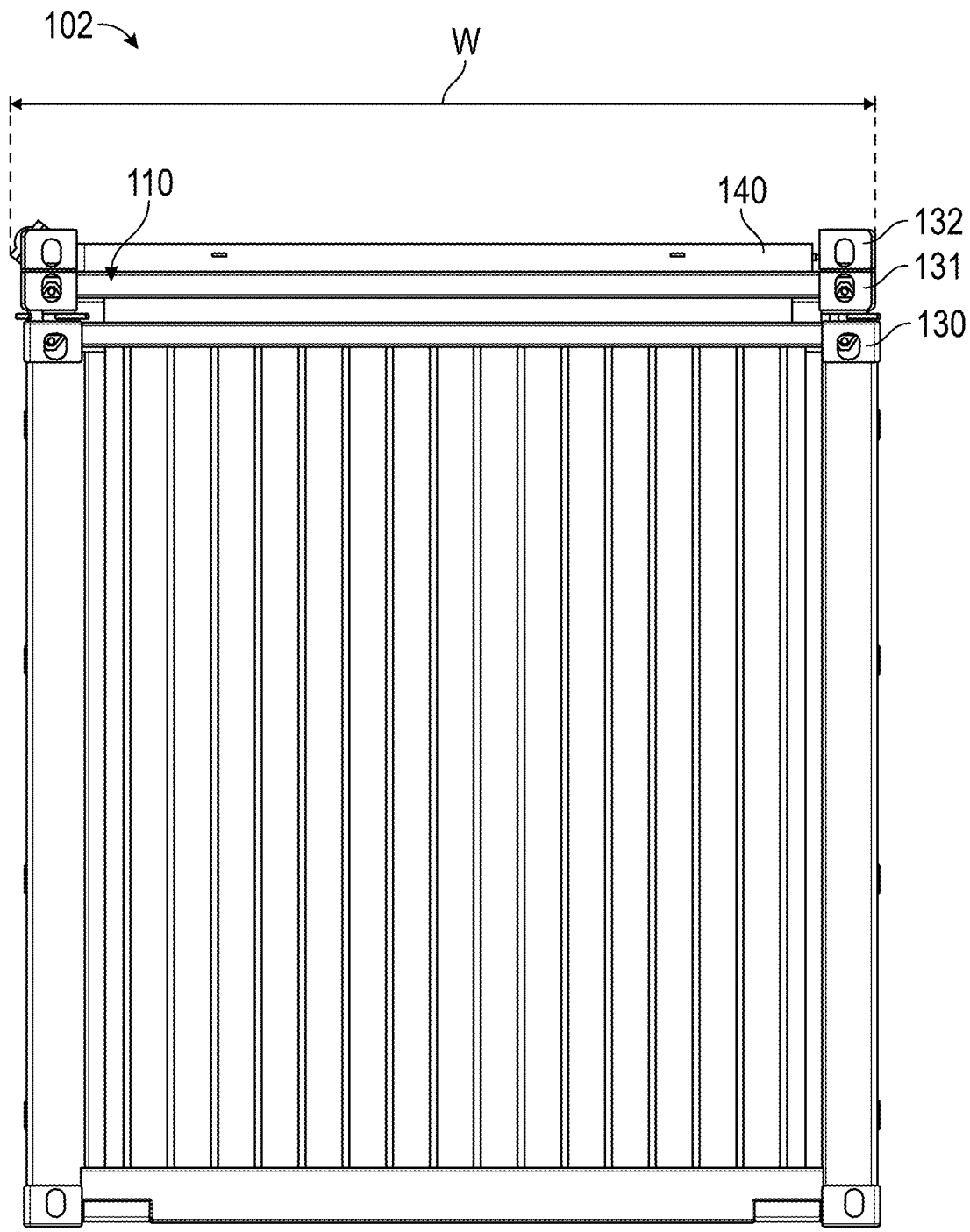
FIG. 2E is a rear view of the solar generation system in FIG. 2D.

FIGS. 2A-2F are various views of another embodiment of a solar generation system 102 having the single deployable solar array 112 on top of the cargo container 100 with a movable pivot point actuation system 149. FIG. 2A is a perspective view of the system 102 having the solar array 112 in a stowed configuration. FIG. 2B is a perspective view of the system 102 in a deployed configuration. FIG. 2C is a close-up perspective view of the system 102 showing the actuation system 149 with a movable pivot point. FIG. 2D is a side view of the system 102 having the solar array 112 in a stowed configuration and shown without an actuation system. FIG. 2E is a rear view of the system 102. FIG. 2F is a perspective view of the system 112 shown deployed. Any of the embodiments of the system 102 of FIGS. 2A-2F may have any of the same or similar features and/or functions as any other embodiments of solar generation systems described herein, such as any of the embodiments of the system 101 of FIGS. 1A and 1B, and vice versa, except as otherwise described.

Advantageously, the number of solar panels implemented in a solar generation system may be variable based on needs. For example, as shown in FIGS. 2A-2B, the mobile solar generator system 102 may include only two solar arrays 112, 116, including the first rotating solar array 112 having panel frames 140 and solar panels 141 mounted to the hinge tube 120 of the base frame 110, and the second stationary solar array 116 having panel frames 146 and solar panels 147 positioned on top of and/or in between the base frame 110. To support only one rotating solar array on either side of the base frame 100, the base frame 110 may include one hinge tube 120, instead of two, disposed between two corner castings 132 and along a long side of the base frame 110. Additional embodiments are shown and described herein, such as in FIGS. 4A and 4B having, respectively, three solar arrays and two solar arrays. For example, as shown in FIG. 4B, a mobile solar generation system may have only two rotating solar arrays mounted to two sides of the base frame 310 and no middle solar array positioned on top of the container 300.

As shown in FIG. 2B, in some embodiments, each of the panel frames 140 may be mounted to and rotatable around the hinge tube 120. The panel frames 140 may connect to each other, for example with brackets, pins, etc., so that the panel frames 140 rotate together. In some embodiments, the panel frames 140 may be portions of a single, larger panel frame that rotates. The hinge tube 120 connects to openings in faces of opposing corner castings 132. The panel frames 140 may rotate around the hinge tube 120 to enable stowing the rotating solar array 112 above the container 100 for movement and transport and then opening to deploy the solar array 112 during use.

As shown in FIGS. 2D and 2E, the solar panels 141 may be stowed such that a profile of the mobile solar generation system 112 is still substantially rectangular and the addition of height from the mobile solar generator is small. This protects the solar panels 141 from damage during movement and allows the entire shipping container 100, base frame 110, and solar panel frame(s) 140 separately or in an assembly to be transported without exceeding height, width, and/or length restrictions associated with road transportation of standard intermodal shipping containers.

As shown in FIG. 2D, the system 102 when assembled on the container 100 may together have an overall height H as measured vertically from a lower-most surface of the container 100 to an upper-most surface of the stowed system 102. The overall height H may be in a range from 4' to 12', from 5' to 11', from 6' to 10', from 7' to 10', about 9'3", or 9'3". The overall width W may be no greater than 12', no greater than 11', no greater than 10', no greater than 9', no greater than 8'10", no greater than 8'8", no greater than about 8'6", no greater than 8'4", or no greater than 8'6".

The system 102 itself (i.e. not including the container 100) when stowed may have an overall thickness T as measured vertically from a lower-most surface of the stowed system 102 to an upper-most surface of the stowed system 102. This dimension may be from a lower-most surface of a lower corner casting 131 to an upper-most surface of an upper corner casting 132. This dimension may not include the electronics enclosure 301. In some embodiments, the profile or thickness T of the solar generator system 102 may be minimal or small such that the overall height H of the system 102 and the container 100 is substantially unchanged or minimally increased, relative to the height of the container 100 alone, by the installment of the solar generator system 102. In some embodiments, the thickness T of the solar generator system 102 may be about the height of two stacked corner castings. In some embodiments, the thickness T of the solar generator system 102 may be about 9". In some embodiments, the thickness T of the solar generator system 102 may be in the range from 4" to 20", from 5" to 18", from 6" to 16", or from 7" to 14". The thickness T may be no greater than 24", no greater than 20", no greater than 18", no greater than 16", no greater than 14", no greater than 12", or no greater than 10".

The system 102 stowed and/or deployed may have an overall length L as measured horizontally from a first end of the system 102 (e.g., left, as oriented) to an opposite end of the system 102 (e.g., right, as oriented). The length L may be measured from one end of a solar array, e.g., a deployable solar array, to an opposite end. The overall length L may be in a range from about 5' to about 45', from about 7' to about 43', from about 8' to about 42', from about 9' to about 41', from about 10' to about 40', or from 10' to 40'. In some embodiments, the overall length L may be no greater than 43', no greater than 42', no greater than 41', no greater than 40', no greater than 23', no greater than 22', no greater than 21', no greater than 20', no greater than 19'10.5", no greater than 13', no greater than 12', no greater than 11', no greater than 10', or no greater than 9'9.75". In some embodiments, the overall length L may be 10' or about 10', 11' or about 11', 12' or about 12', 13' or about 13', 20' or about 20', 21' or about 21', 22' or about 22', 23' or about 23, 40' or about 40', 41' or about 41', 42' or about 42', or 42' or about 43'. Thus, in some embodiments, the system 102 may extend beyond the overall length of the container 100. For example, the deployable panel(s) may have longer lengths than the container 100.

As shown in FIG. 2E, the system 102 may have an overall width W when stowed. The overall width W may be in a range from 4' to 12', from 5' to 11', from 6' to 10', from 7' to 9', about 8'6", or 8'6". The overall width W may be no greater than 12', no greater than 11', no greater than 10', no greater than 9', no greater than 8'10", no greater than 8'8", no greater than about 8'4", or no greater than 8'6".

In some embodiments, the solar generator system 102 may include the actuation system 149 configured to control deployment and/or stowing the panel frames 140 as desired. In some embodiments, the actuation system 149 may be linearly actuated as shown in FIGS. 2A-2C. One or more linear actuators 150 may be affixed to the base frame 110 and connected to the panel frames 140. There may be two actuators 150 as shown, or one, three, four, five, six, seven, eight or more actuators 150. The actuators 150 may connect to the panel frames 140 through mechanical lever arms 151. The actuators 150 may be hydraulically, electrically, and/or manually operated.

In some embodiments, as shown in FIGS. 2A-2C, the actuators 150 may connect to the base frame 110, such as the long member 111, at an upward end of the actuator 150. The actuator 150 may connect to the panel frame 150 via a linearly movable first arm 152 attached to the rotatable lever arm 151. The lever arm 151 may be attached to the first arm 152 at a pivot point 153. The pivot point 153 may include a pin or shear connection extending through the two arms 151, 152 to allow relative rotation. The first arm 152 and thus the pivot point 153 may move linearly, for example slide, along the length of the actuator 150 as the panel frame 140 deploys and stows. The pivot point 153 may move downward as oriented during deployment of the panel frame 140 and upward during stowing. The arms 151, 152 may be rigid metal members configured to hold the panel frames in the deployed configuration. The hydraulic or other actuator 150 may be attached to the pivot point 153. The actuator may pull and push on the pivot point 153 to cause the end of the arm 151 to move linearly along the length of the support 152. The actuator 150 may be supported by a housing or support that is connected to the base frame 110, or the actuator 150 may be directly attached to the based frame 110.

The actuation system 149 may be included on a single side of the container 100 as shown in FIGS. 2A-2C. In some embodiments, a second actuation system 149 may be used on the opposite side of the container 100 to deploy a second solar array about a second hinge, for example the solar generation systems of FIGS. 1A, 1B, 4A, and 4B. There may be two actuation systems 140. In some embodiments, a single actuation system 149 may be temporarily attached to a first side of the base frame 110 to deploy a first solar array. The same actuation system 149 may then be removed from the first side and attached to a second opposite side of the base frame 110 to deploy a second solar array.

FIG. 2F is a perspective view of the solar generation system 102 shown deployed without the actuation system 140. The system 102 may be deployed manually, as described. Further, the container 100 may include one or more doors 117, 119. The first door 117 and second door 119 may be included. The doors 117, 119 may open and close to provide access to an internal volume 115 of the container 100. The volume 115 may have length, width, and height dimensions approximately the same as the container 100 as described herein. The volume 115 may be used to store items for transport, or for office or home items for habitation, or other uses. The doors 115, 119 may be hinged and configured to swing open and to be locked in the closed position. The system 102 may provide power to electronics inside the volume 115, as further described herein.

Figure 3A:
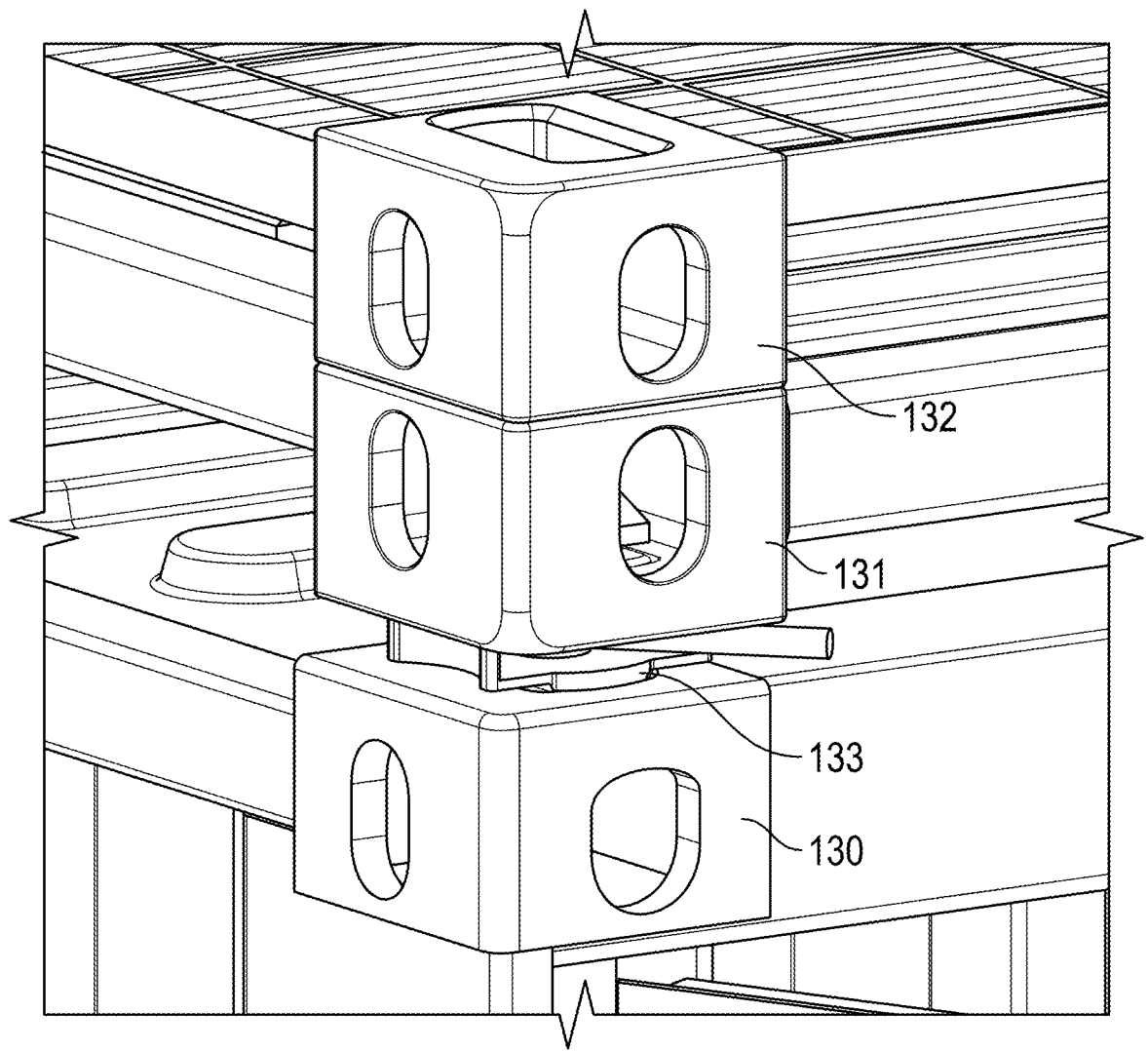
FIG. 3A is a close-up perspective view of embodiments of corner castings connected to a cargo container casting via a twist lock connector that may be used with any of the mobile solar generation systems herein.
Figure 3B:
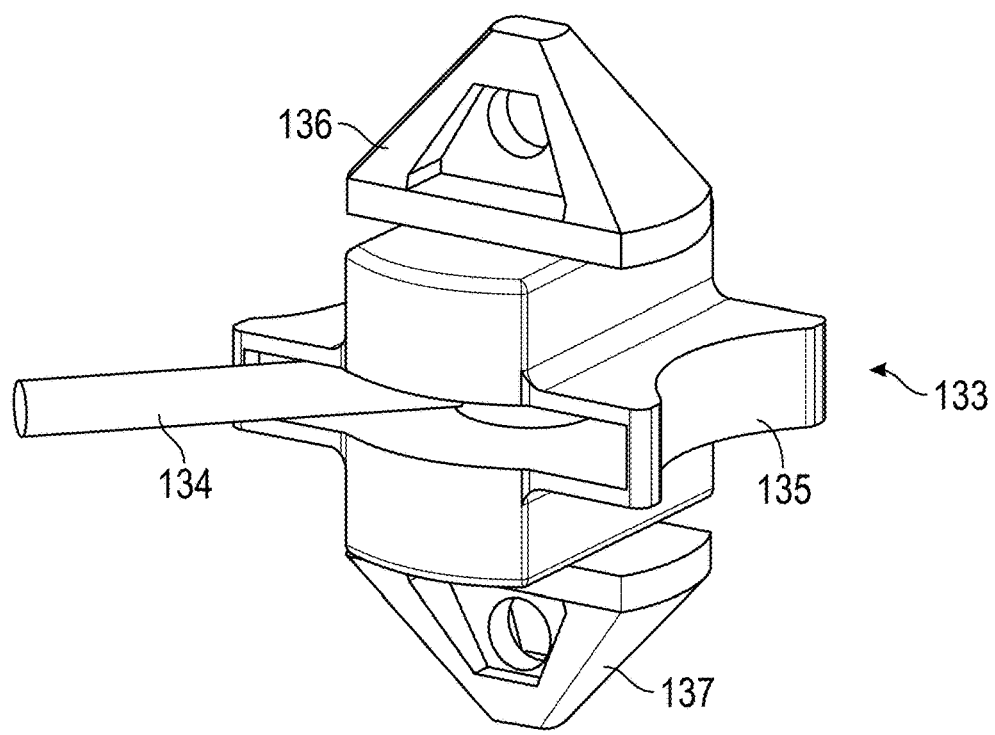
FIGS. 3B and 3C are perspective views of components of the twist lock connector and corner castings of FIG. 3A.
Figure 3C:
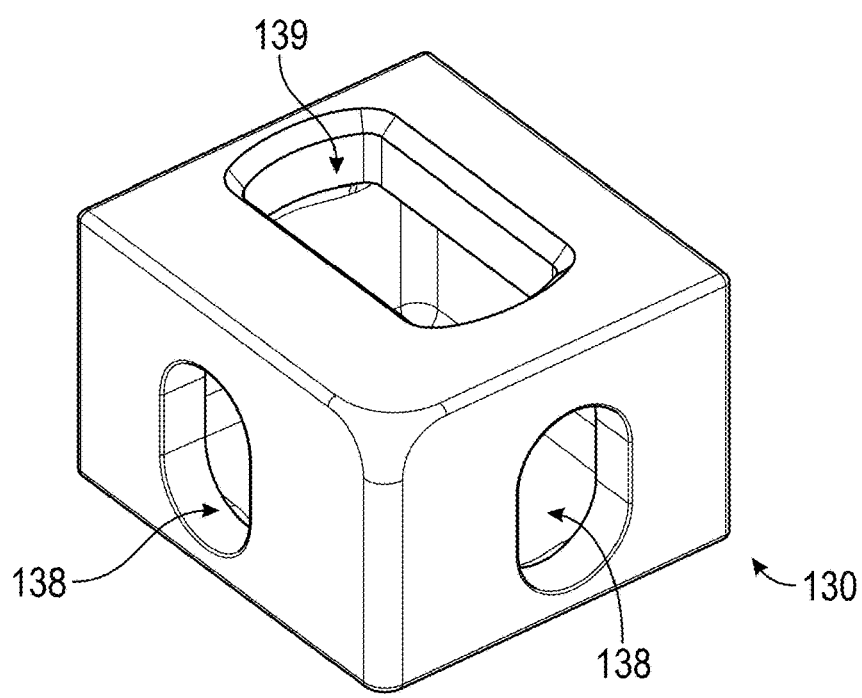

FIG. 3A is a close-up perspective view of embodiments of corner castings 131, 132 connected to the cargo container corner casting 130 via a twist lock connector 133 that may be used with any of the mobile solar generation systems herein. FIG. 3B is a perspective view of components of the twist lock connector 133. FIG. 3C is a perspective view of a corner casting.

FIG. 3A shows the upper corner castings 132 of the base frame 110 mounted on top of the lower corner castings 131 of the base frame 110. The lower corner castings 131 of the base frame 110 may be connected to the corner castings 130 of the container 100. In some embodiments, the lower corner castings 131 of the base frame 110 may be connected to the corner castings 130 of the container 100 through the twist lock connector 133.

FIGS. 3B and 3C are perspective views of the connector 133 and corner casting 130 in isolation. The connector 133 includes a lever 134 attached to an upper lock 136 and a lower lock 137. Rotation of the lever 134, for example by hand, cause the upper and lower locks 136, 137 to rotate. A housing 135 contains part of the lever 134 and supports the locks 136, 137. Further, the corner casting 130 has an elongated, upper opening 139 defined by an upper face thereof and side openings 138 defined in side faces thereof. When assembled, the lower lock 137 is received into the container corner casting 130 through the opening 139. The upper lock 136 is then received into a lower opening of the lower corner casting 131, which is located at a corner of the base frame 110. The lever 134 is rotated to rotate and lock into place the locks 136, 137 due to a longer dimension of the locks 136, 137 being oriented along the shorter dimension of the openings 139 in the castings 130, 131. In this manner the base frame 110 may be fixedly attached to the container 100. To remove the solar array, the lever 134 may be rotated in the opposite direction to align the locks with the openings 139, and the castings may be separated by lifting the base frame 110 upward.

The connector 133 may be used to lock in place multiple solar array systems 102 that are stacked on top of each other. There may be one connector 133 used between each system 102. The connector 133 may be used to fixedly attach an upper corner casting 132 of a system 102 located below in the stack to a lower corner casting 131 of a system 102 located above, etc.

FIGS. 4A-5H are various views of additional embodiments of solar generation systems. The solar generation systems of FIGS. 4A-5H may include the same or similar features and/or functions as the systems of FIGS. 1A-3C, and vice versa, except as otherwise described.

Figure 4A:
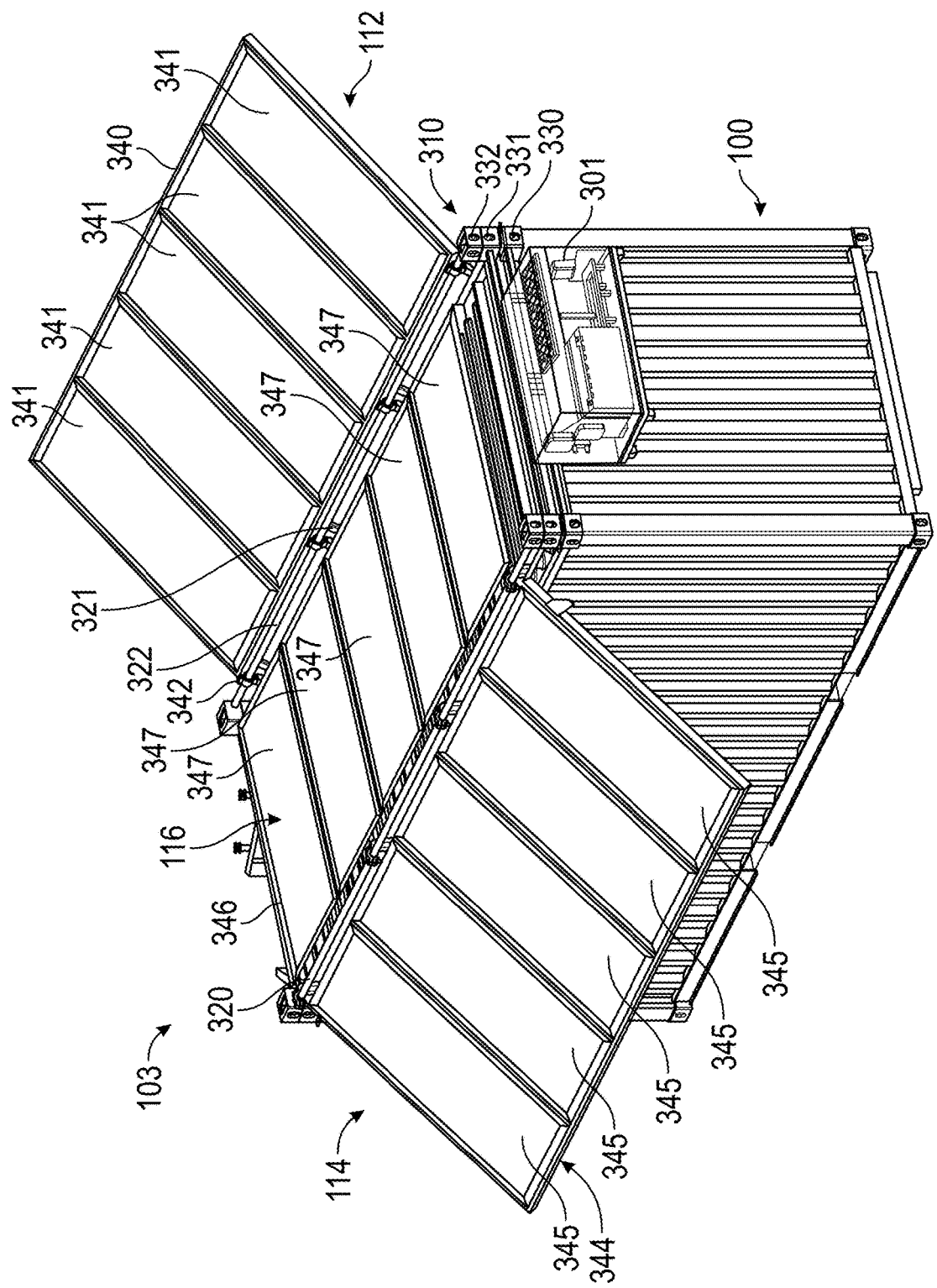
FIG. 4A is a perspective view of another embodiment of a solar generation system having two deployable arrays and two hinge lines shown in a deployed configuration.
Figure 4B:
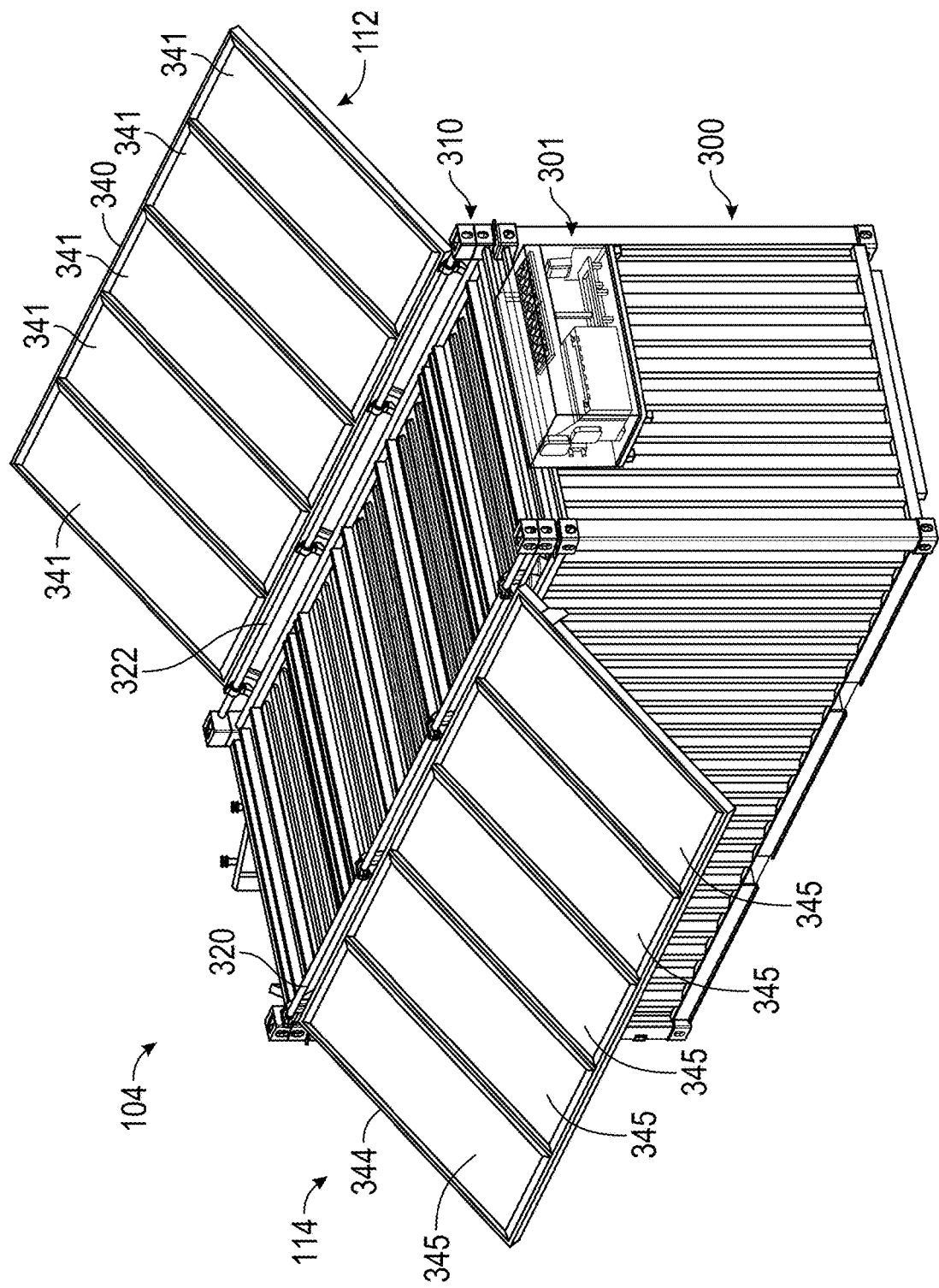
FIG. 4B is a perspective view of another embodiment of the system of FIG. 4A without a central array.

FIG. 4A is a perspective view of another embodiment of a solar generation system 103 shown in a deployed configuration having two deployable arrays 112, 114, a single central fixed solar array 116, and two hinge tubes 320, 322. FIG. 4B is a perspective view of another embodiment of a system 104 which may be the same as the system 103 but without a central array. The systems 103, 104 may include a base frame 310, panel frames 340, 344, 346 having respectively solar panels 341, 345, 347, which may have the same or similar features and/or functions respectively as the base frame 110, panel frames 140, 144, 146, and solar panels 141, 145, 147. However, as shown, the panel frames 340, 344, 36 may each be a single, large, panel frame supporting all respective solar panels 341, 345, 347. As shown in FIG. 4B, there may be no central array such that the top surface of the container 100 is exposed when the solar arrays 112, 114 are deployed. The arrays 112, 114 may be deployed manually or with an actuation system as described herein. Further, the hinge tubes 320, 322 may extend along parallel, coplanar axes, as described herein, and the panel frames 340, 344 may be vertically stacked on top each other when stowed. The systems 103, 104 may include the upper and lower corner castings, base frame members, etc., as described herein.

The mobile solar generation systems 103, 104 may further include a power electronics enclosure 301. Power electronics may be secured inside the enclosure 301, which may be metal, and form an electronics enclosure. As shown and described in further detail with respect to FIG. 5F, the enclosure 301 may include one or more solar charge controllers 304, one or more batteries 303, one or more inverters 302, and supporting wiring and electronics. In some embodiments, the enclosure 301 may be attached to, for example bolted, or otherwise supported by, the base frame 310. In some embodiments, the enclosure 301 with power electronics may allow ease of transportation and facilitate deploying the solar array(s) and providing power without the need to connect the solar wiring and cables once at the desired location, as the connections will already be made. Mounting the electronics enclosure 301 outside the container 100 may allow the shipping container 100 to be empty and function as a normal shipping container (e.g., storing goods). In some embodiments, the electronics enclosure 301 can be configured to not exceed heights of the systems 103 and/or 104 when the solar arrays are stowed. For example, an upper surface of the enclosure 301 may be located vertically below a lower surface of the lowest solar panel or panel frame. The power electronics may also be stored inside the intermodal shipping container 100, with solar panel wiring routed inside the container 100.

Figure 5A:
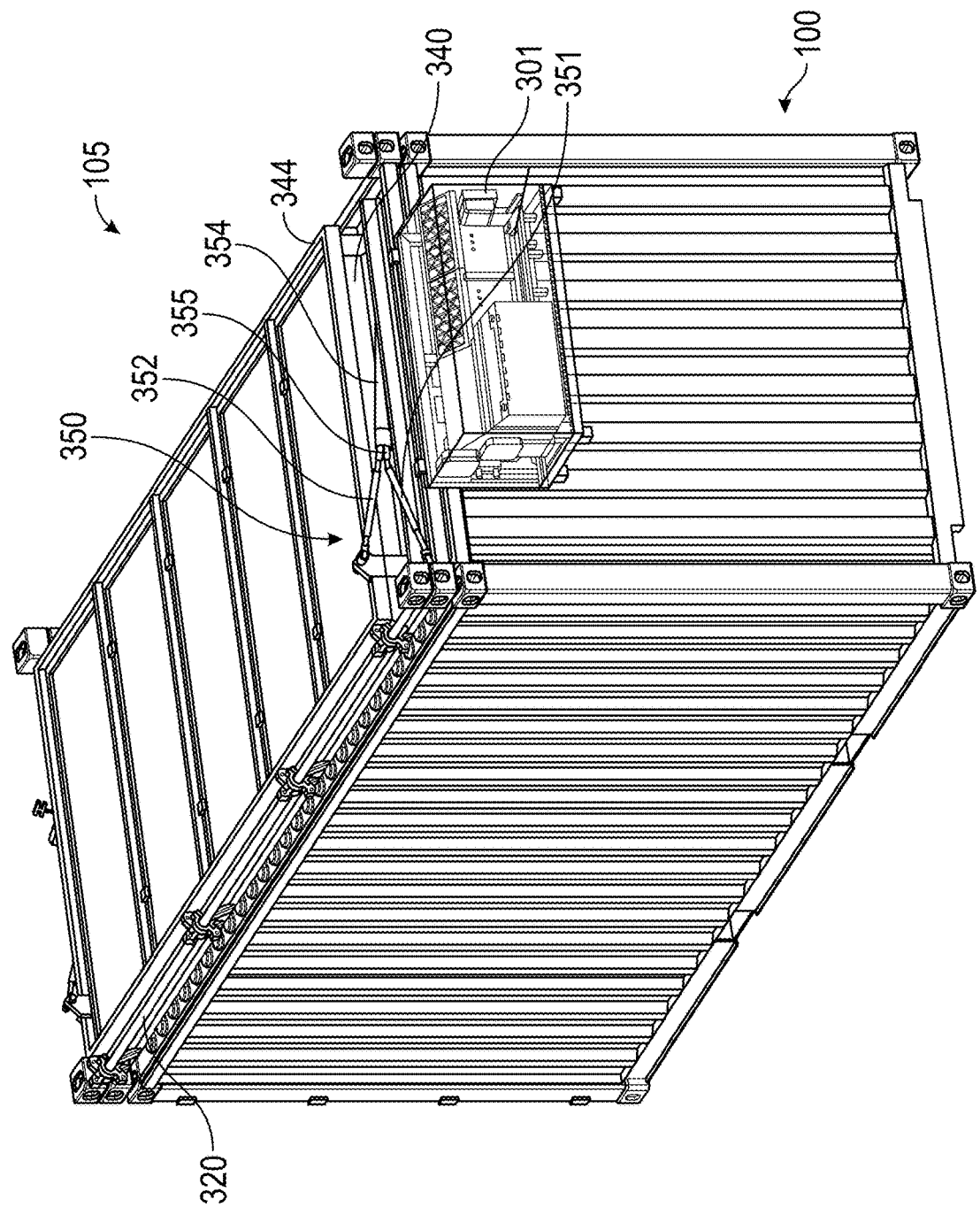
FIG. 5A is a perspective view of another embodiment of a solar generation system having an end-mounted actuation system and electronics enclosure and shown in a stowed configuration.
Figure 5B:
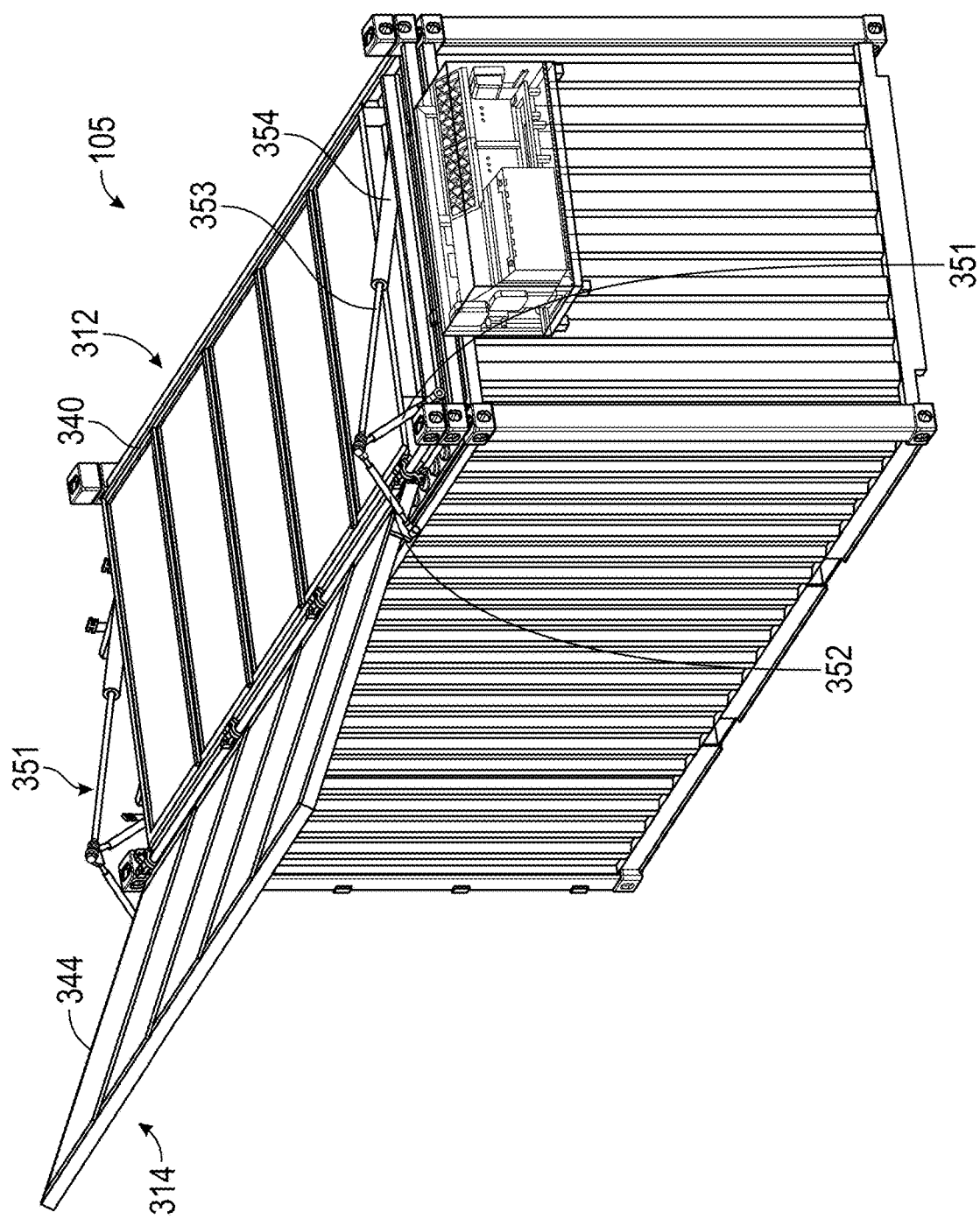
FIGS. 5B and 5C are perspective views of the solar generation system of FIG. 5A in first and second deployed configurations.
Figure 5C:
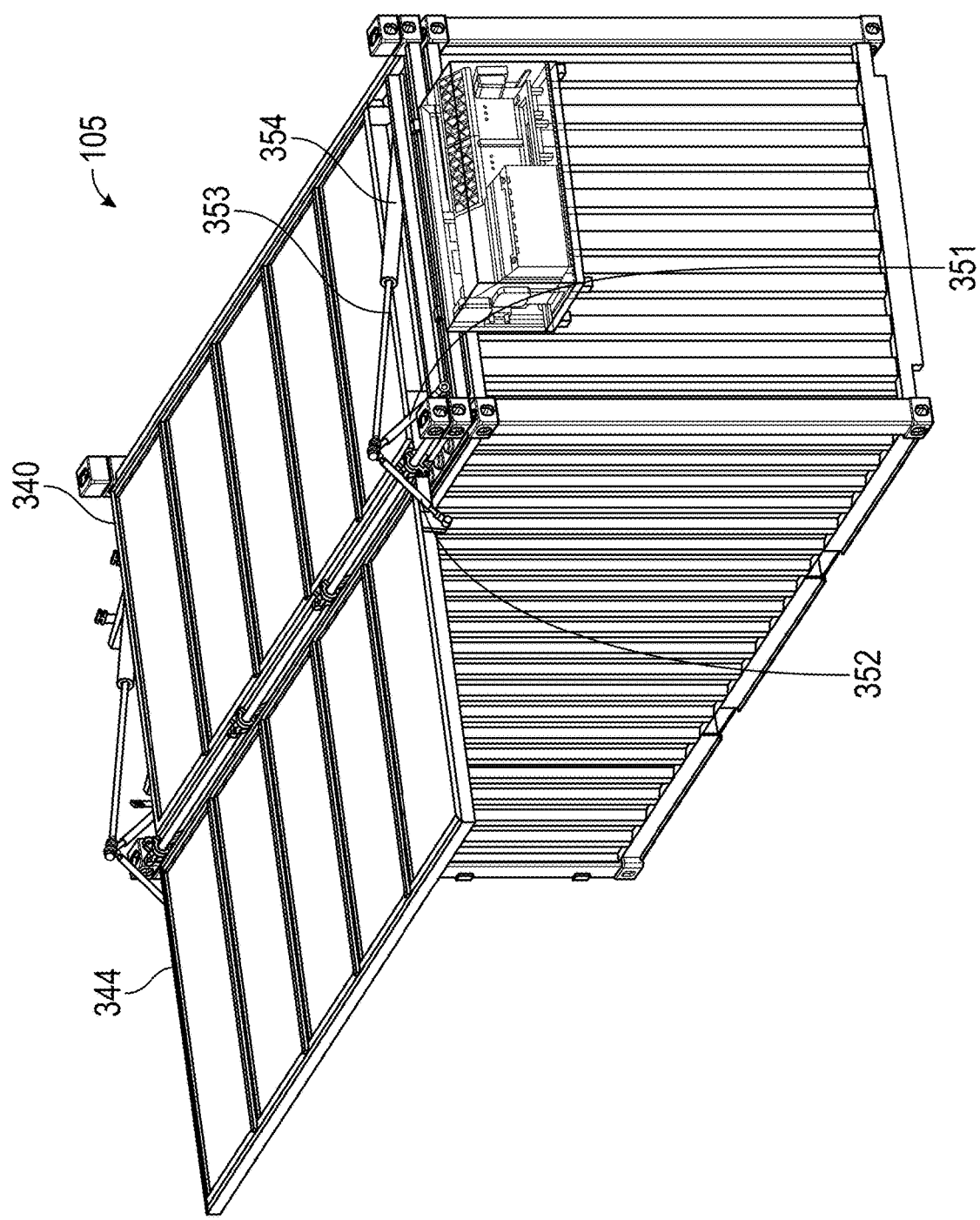
Figure 5D:
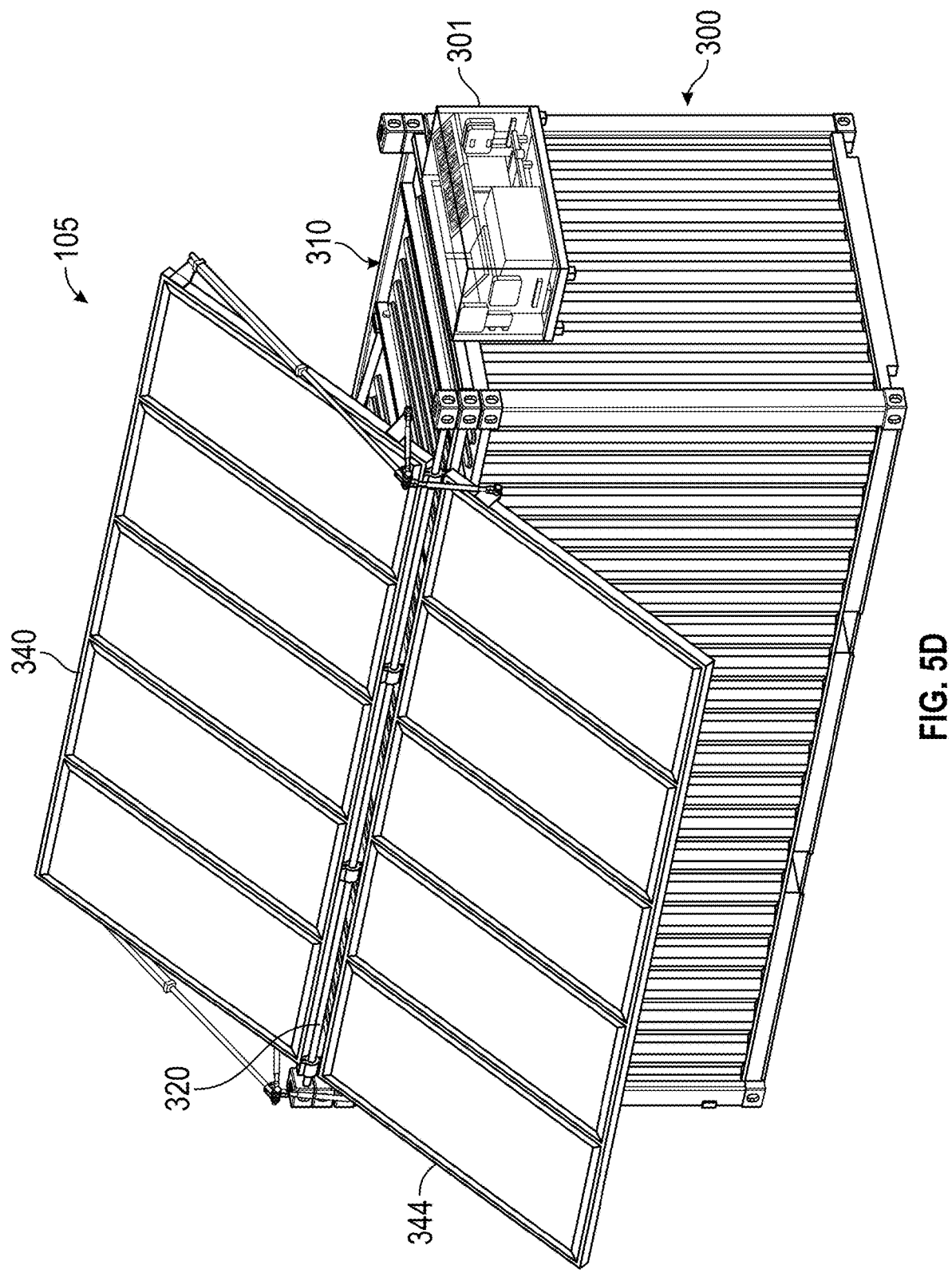
FIGS. 5D and 5E are perspective views of the solar generation system of FIG. 5A with the arrays in a planar and angled deployed configuration.
Figure 5E:
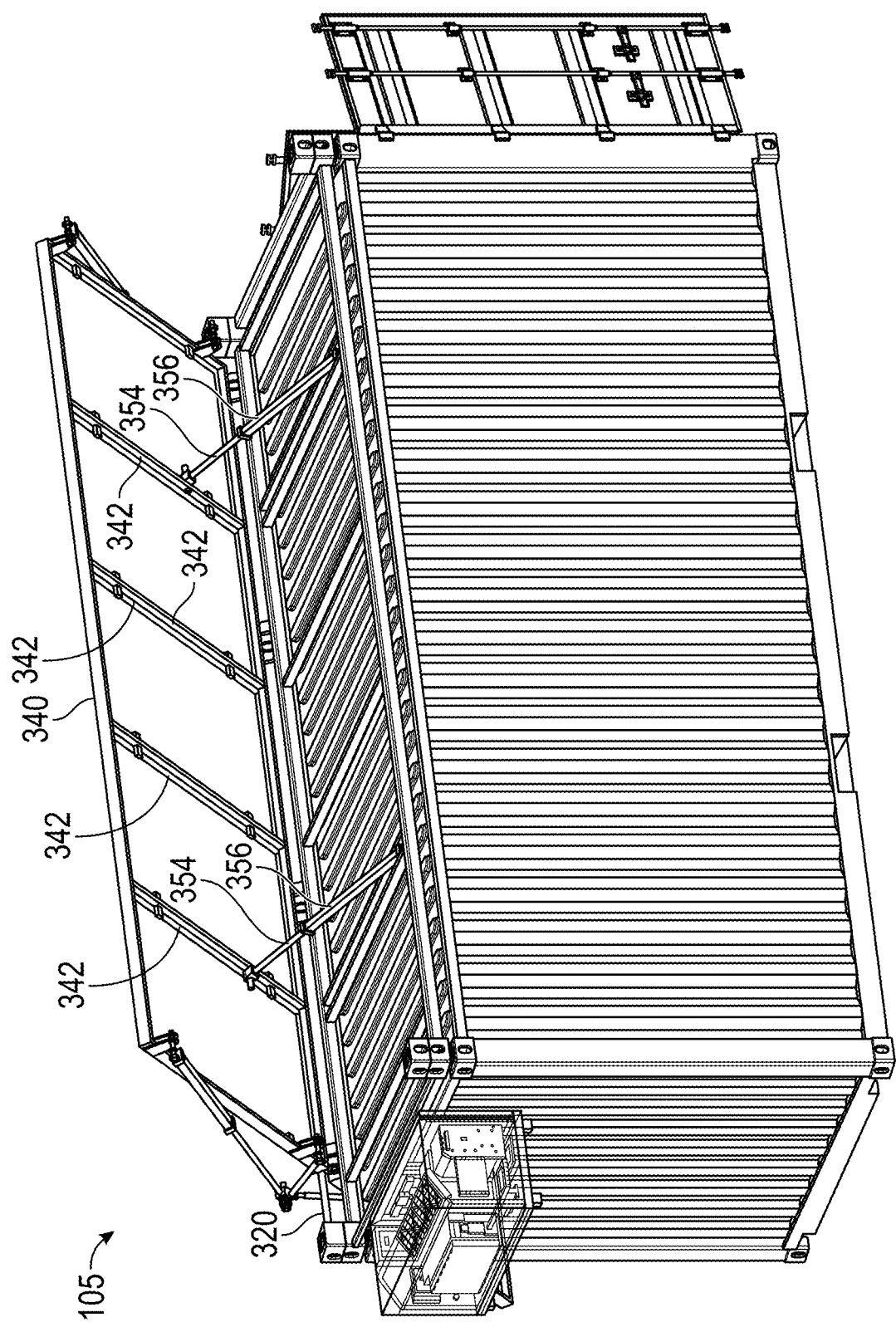
Figure 5F:
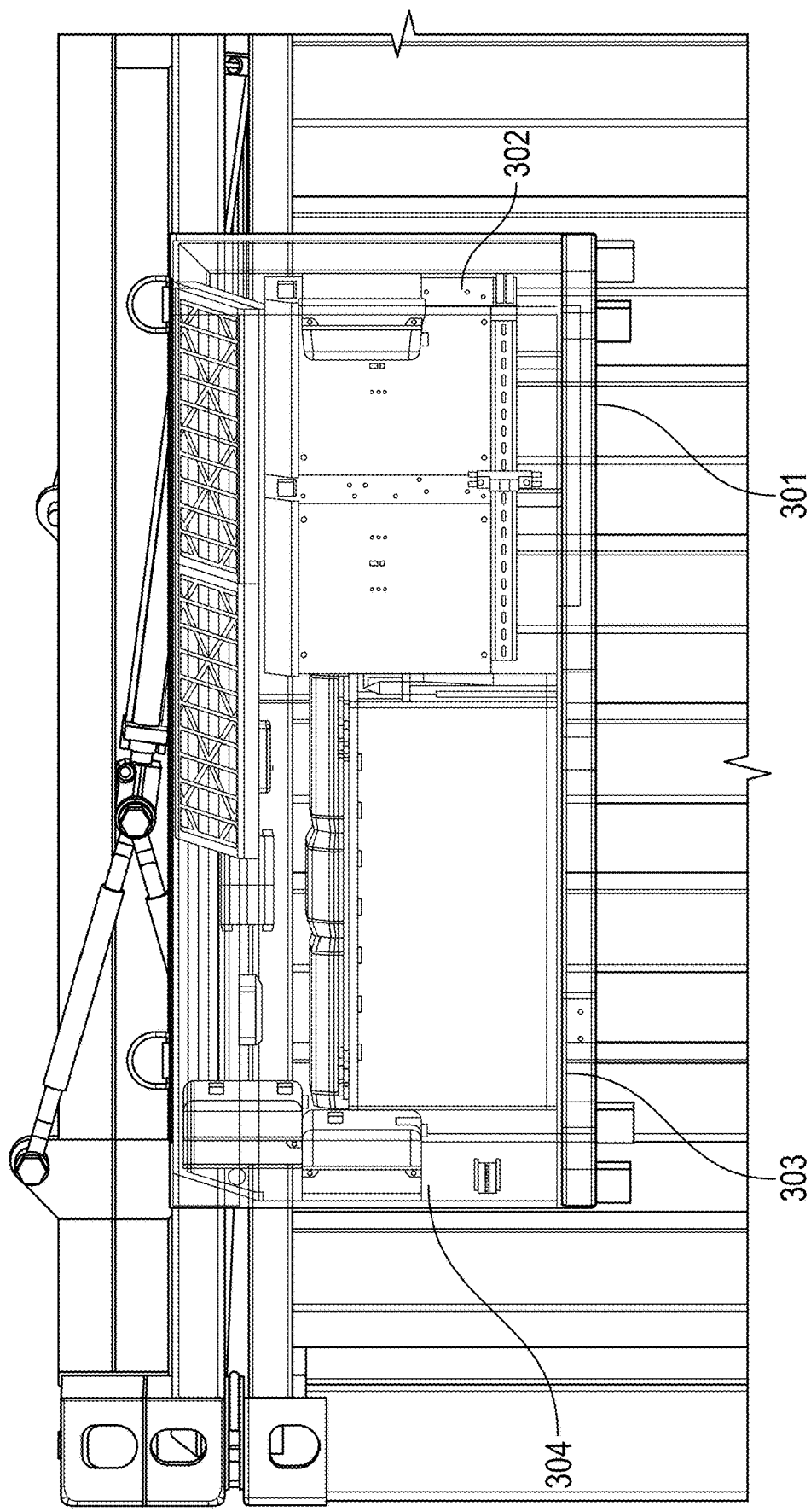
FIG. 5F is a close-up end view of the solar generation system of FIG. 5A in a stowed configuration showing components of an electronics enclosure.
Figure 5G:
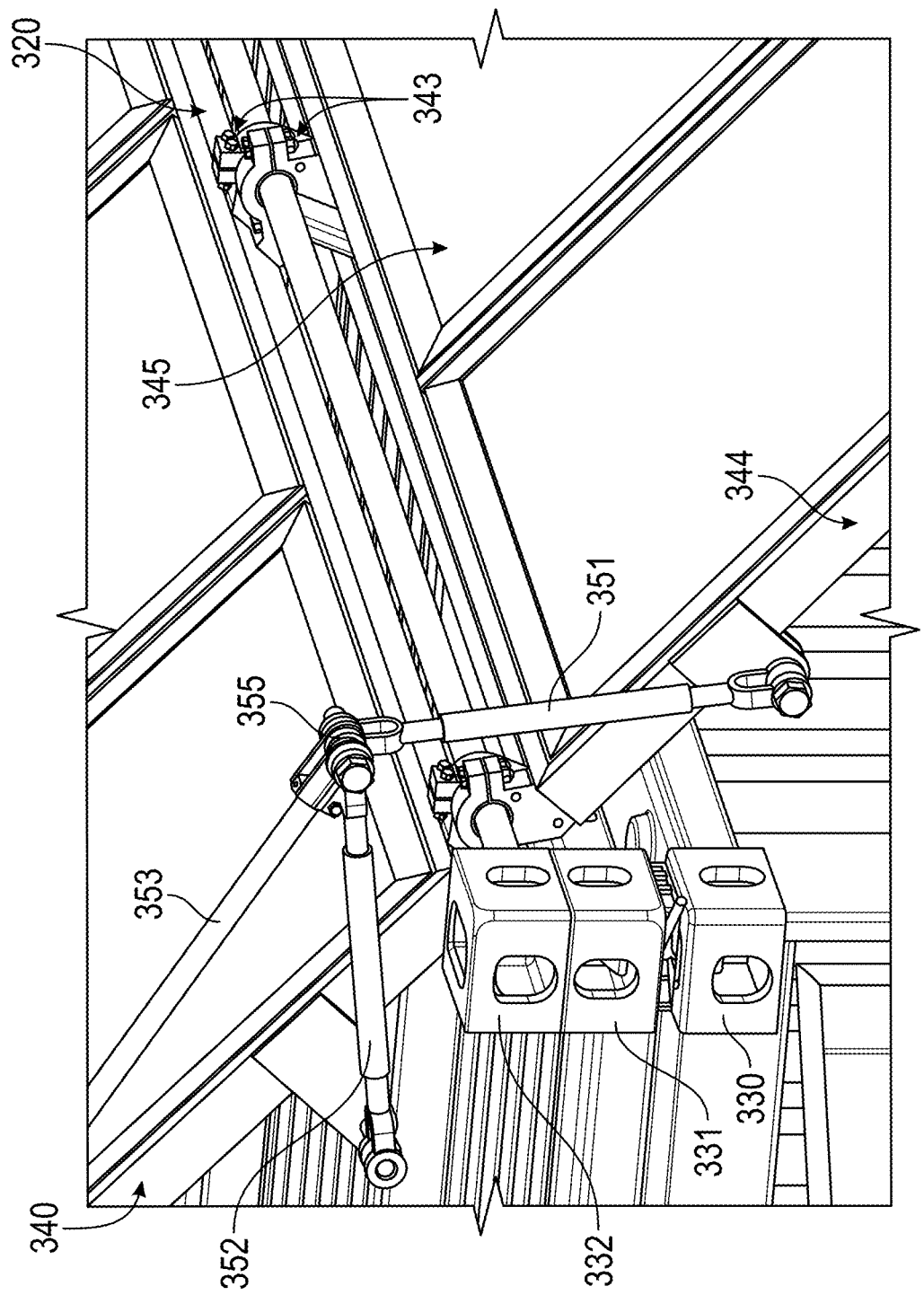
FIG. 5G is a close-up perspective view of the hinge and actuation system of the solar generation system of FIG. 5D in a deployed configuration.
Figure 5H:
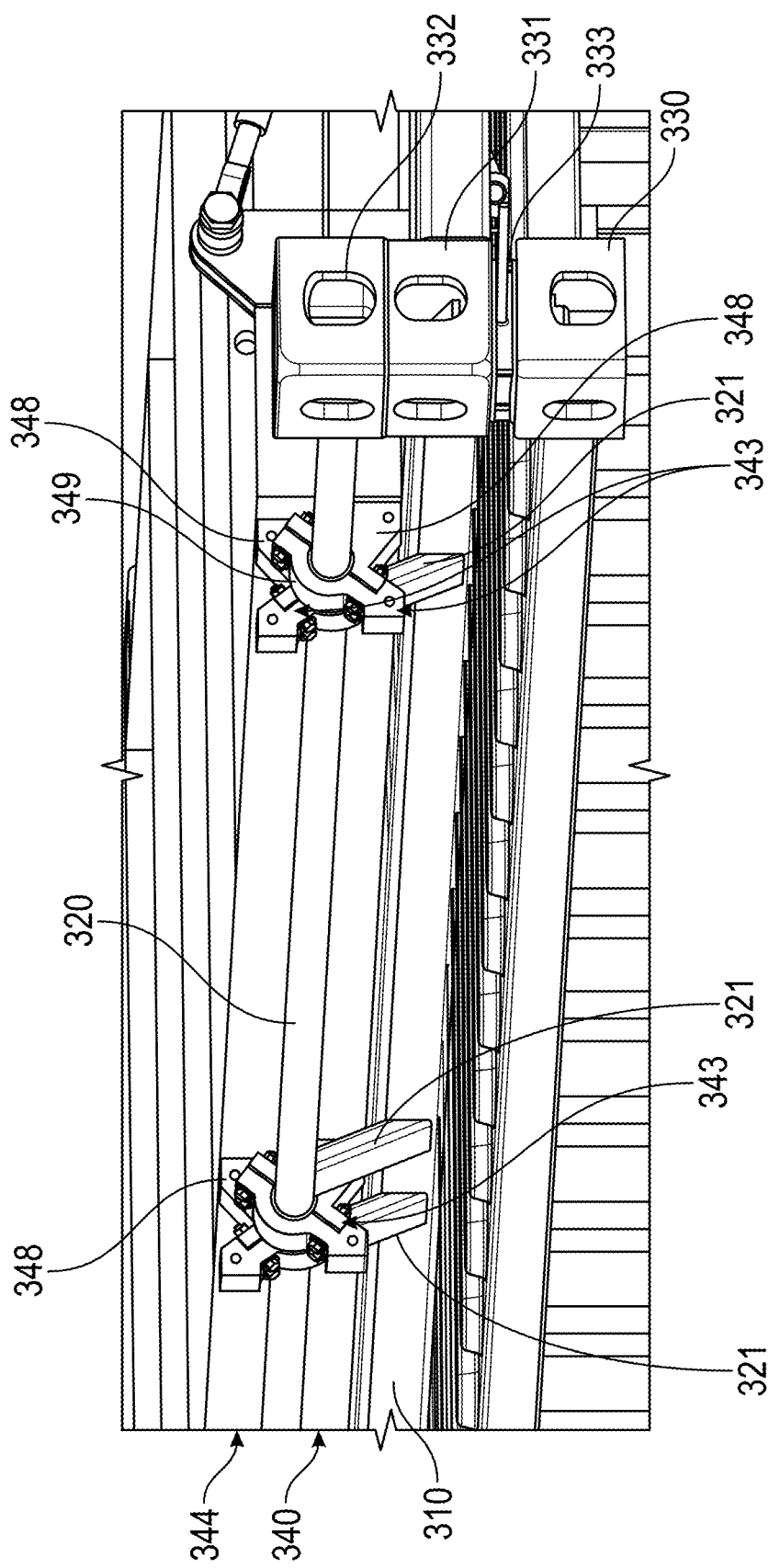
FIG. 5H is a close-up perspective view of hinge mounts of the solar generation system of FIG. 5A in a stowed configuration.

FIGS. 5A-5H are various views of another embodiment of a solar generation system 105. FIG. 5A is a perspective view of the system 105 having an end-mounted actuation system 350 and electronics enclosure 301 and shown in a stowed configuration. FIGS. 5B and 5C are sequential perspective views of the system 105 in first and second deployed configurations. FIGS. 5D and 5E are perspective views of the system 105 with the arrays in a planar and angled deployed configuration. FIG. 5F is a close-up end view of the system 105 in a stowed configuration showing components of the electronics enclosure 301. FIG. 5G is a close-up perspective view of the hinge and actuation system of the system 105 in a deployed configuration. FIG. 5H is a close-up perspective view of hinge mounts of the system 105 in a stowed configuration.

Two rotating solar arrays 312, 314 having respective panel frames 340 and 344 may both be rotatably mounted to a single hinge tube 320 and configured to be deployed into a planar configuration and rotated about a rotation axis defined by the hinge tube 320. Each of the rotating solar arrays 312, 314 may be mounted to the hinge tube 320 through one or more hinge mounts 343, which are laterally offset from the hinge mounts of the other rotating solar array 312, 314 (see FIG. 5H). The hinge mounts 343 of the rotating solar arrays 340 and 344 may be angled and attached to the panel frames 340, 344 via arms 321 at a point such that the solar arrays 312, 314 are parallel when stowed when attached to the same hinge tube 320. This allows the panel frames 340, 344 to lie flat on top of the base frame 310 in the stowed configuration.

As shown in FIG. 5H, the hinge mounts 343 may receive the hinge tube 320 through openings of the mounts 343 to rotatably couple with the hinge tube 320. The mounts 343 may attach to respective panel frames 340, 344 via lugs 348. The mounts 343 may attach to the base frame 310 via arms 321. The arms 321 extend upwardly and outwardly from the base frame 310 long member to support the mounts 343 in a position outward from the long ends of the panel frames 340, 344. The lugs 348 of the mounts 343 attached to the panel frame 340 extend inwardly and downwardly from the mount 343 and hinge line to attach to the lower panel frame 340 (when stowed). The lugs 348 of the mounts 343 attached to the panel frame 344 extend inwardly and upwardly from the mount 343 and hinge line to attach to the upper panel frame 344 (when stowed). The same mounts 343 may be used for attaching to the panel frames 340, 344 but rotated or flipped to be used for the upper or lower panel frame. The mounts 343 may include the lug 348 portion attached to a backing 349 to form the inner opening through which the tube hinge 320 is received. The backing 349 may include a first part with matching mating surfaces for connecting to respective mating surfaces of the lug 348 portion, which parts may be bolted or otherwise attached together. Such design allows for a single hinge mount 343 to be fabricated and used for upper and lower panel frames 340, 344 but flipped as described. This saves on cost and allows for simpler design. The mounts 343 and arms 321 may be laterally offset and adjacent to each other to apply rotational loads to respective frames in the same general area.

In some embodiments, the panel frames 340, 344 may be controlled using one or more support arms 351, 352, 354. The arm 354 may extend a shaft 353 linearly outward for deployment and retract the shaft 353 inward for stowing. The shaft 353 at an end thereof may be rotatably attached to ends of support arms 351, 352. The arms 351, 352 at opposite ends thereof may be attached to the panel frames 340 and 344 and actuated to deploy and stow the panel frames 340 and 344. The arms 351, 352 may each be connected and pivot or rotate relative to each other at a pivot point 355 (see FIG. 5G) on one end and connected to respective panel frames 344, 340 through tie rods on the other ends. In some embodiments, the actuation mechanism 350 may include a first support arm 351 attached to the panel frame 344, a second support arm 352 attached to the panel frame 340, and the third support arm 353 attached to the panel frame 340. Each of the support arms 351, 352, 354 may include an actuator (e.g., a linear actuator that extends and retracts a shaft, similar to the arm 354 and shaft 353). In some embodiments, the arm 351 may be attached to the panel frame 340 proximate the hinge tube 320; the second arm 352 may be attached to the panel frame 344 proximate the hinge tube 320, and the third arm 353 may be attached to the panel frame 340 distal to the hinge tube 320 farther than the connection point between the arm 351 and the panel frame 340.

The mobile solar generation system 105 may further include a second actuation mechanism 351 having a similar set of support arms as the actuation mechanism 350 but attached to an opposite back end of the base frame 310 and container 100. The actuation mechanism 351 may be configured to apply an upward force to deploy the rotating solar array. In some embodiments, the actuation mechanism 351 may be used to stow and deploy the solar arrays.

As shown in FIG. 5E, the system 105 may further include one or more actuators 356 attached to a back side of the panel frame 340 that is opposite the side having the solar panels 341. There are two actuators 356 as shown. There may be one, three, four, five, six or more actuators 356. The actuators 356 may be attached to the rotating solar array 312, e.g., transverse sidewalls 342 of the panel 340, and that is disposed on top of the base frame 310 in a stowed configuration. The actuator 356 may linearly extend and retract a corresponding shaft 354 to deploy the panel frame 340. The actuator 356 may lie flat underneath the panel frame 340 when the panel frame 340 is stowed. The sidewalls 342 may have a height defining a volume therebetween in which the actuators 356 are located when stowed. The actuators 356 may be positioned offset from the corresponding sidewall 342, for example in the direction of the long members of the base frame 310, to avoid interference with the sidewall and for stowage.

In some embodiments, the rotating solar arrays 312, 314 may be operated at different angles relative to a top of the container 300 and/or the sunlight. Advantageously, the panel frames 340, 344 may be configured to be tiltable to be used at an angle facing the sun to optimize solar energy collected based on a geographical latitude and/or a time of year of the solar installation. In some embodiments, the panel frames 340, 344 in a planar configuration may be deployed and tilted around the hinge tube 320 as shown sequentially in FIGS. 5C and 5D. In some embodiments, the panel frames 340, 344 may be tilted using the linear actuation mechanism(s) 356.

Figure 6:
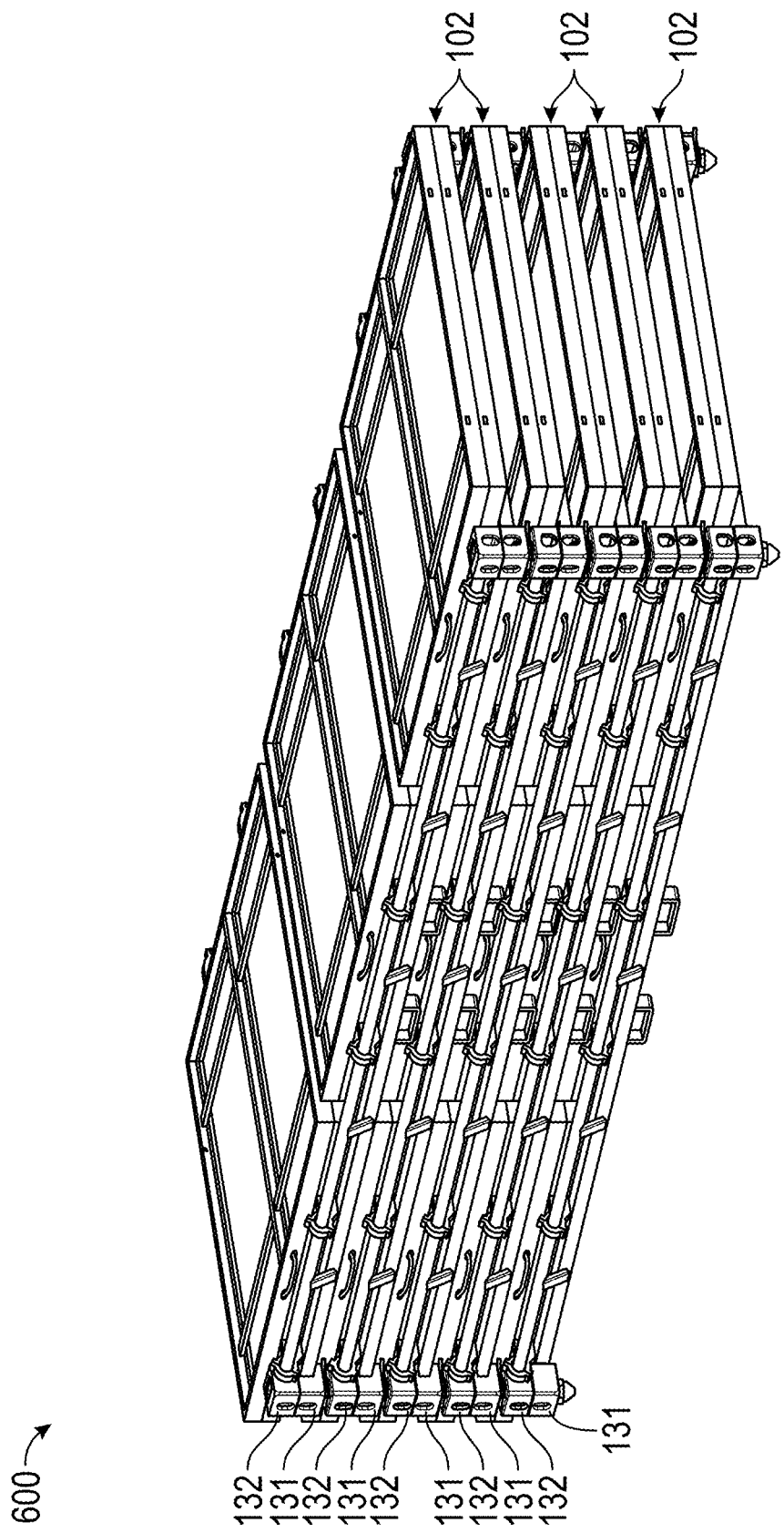
FIG. 6 is a perspective view of a stack of stowed solar generation systems stacked on top of one another.

FIG. 6 depicts a stack of the stowed solar generation systems 102. There are five systems 102 shown stacked. There may be two, three, four, six, seven, eight, nine, ten or more of the systems 102 stacked together. For example, a second solar generation system 102 or a second container 100 may be stacked on top of a first system 102 mounted to a first container 100. In some embodiments, the second system 102 or the second container 100 may be stacked on top of the upper corner castings 132 of the first base frame 110 of the first system 102. In some embodiments, the lower corner castings 131 of the second base frame 110 of the second system 102 may be secured to the upper corner castings 132 of the first base frame 110 of the first system 102. For example, each of the first and second base frames 110 may include a plurality of the upper corner castings 132 and a plurality of the lower corner castings 131 as described herein. In some embodiments, the plurality of upper corner castings 132 of the first base frame 110 may be connected to the plurality of lower corner castings 131 of the second base frame 110 such that the second base frame 110 is secured to the first base frame 110 through the respective corner castings. The base frames may be secured in place with the twist lock connectors as described herein. Stacking the base frames 110 may facilitate easy transportability using standard intermodal shipping methods, such as trucks, rail and ships. The strength of the corner castings allows a multitude of base frames or mobile solar generation systems to be stacked on top of each other.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein may be modified or otherwise implemented in various other ways without departing from the spirit and scope of the disclosure. Accordingly, this description is to be considered as illustrative and is for the purpose of teaching those skilled in the art the manner of making and using various embodiments of the disclosed mobile solar generator. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including," "comprising," "incorporating," "consisting of," "have," "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first," "second," "third," "primary," "secondary," "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures may also be implemented in a more separated or integrated manner, or even removed or rendered as inoperable in certain cases, as is useful in accordance with a particular application.

What is claimed is:

1. A solar generation system configured for attaching to a cargo container, the system comprising:
    a base frame configured to extend over a top of the cargo container, the base frame comprising two longitudinal members extending along two opposite sides over the top of the cargo container;
    four corner castings each configured to couple the base frame to the cargo container at a respective standard connection at each of four corners of the cargo container via a twist lock connection;
    one or more hinge tubes, each hinge tube attached with a respective one of the two longitudinal members of the base frame and vertically offset from the respective longitudinal member; and
    one or more panel support frames rotatably coupled to the base frame via the one or more hinge tubes, each panel support frame comprising one or more solar panels configured to be unexposed to sunlight with the panel support frame in a stowed configuration and exposed to sunlight with the panel support frame in a deployed configuration.

2. The system of claim 1, further comprising an enclosure coupled to the base frame and comprising electronics electrically connected with the solar panels.

3. The system of claim 1, wherein the corner castings comprise four upper corner castings disposed above four lower corner castings.

4. The system of claim 1, wherein the base frame is configured to support thereon a second base frame or a second cargo container by securing through the corner castings of the base frame with twist lock connectors.

5. The system of claim 1, further comprising one or more actuators configured to rotate the one or more panel support frames about the one of the one or more hinge tubes to the deployed configuration.

6. The system of claim 1, wherein the one or more panel support frames are configured to lie flat on top of the base frame in the stowed configuration.

7. The system of claim 1, wherein at least one of the one or more panel support frames are configured to rotate from the stowed configuration to the deployed configuration about an angle in a range of 90-270 degrees.

8. The system of claim 1, wherein the cargo container is a standard intermodal shipping container.

9. The system of claim 8, wherein the base frame may be configured to have a length that matches a length of the standard intermodal shipping containers, wherein the standard shipping container has a length of between 10 feet and 40 feet.

10. The system of claim 1, wherein an overall height of the system in the stowed configuration is no greater than 12 inches.

11. The system of claim 1, further comprising the cargo container, and wherein the base frame is attached to the top of the cargo container.

12. The system of claim 1, wherein the one or more hinge tubes comprises a first hinge tube and a second hinge tube that are positioned at a same vertical height.

13. The system of claim 12, further comprising one or more hinge mounts connecting a respective panel support frame to a respective hinge tube such that the one or more panel support frames in the stowed configuration are parallel to each other and to the top of the cargo container.

14. The system of claim 13, wherein the one or more hinge mounts comprises a first set of hinge mounts in a first orientation distributed along the first hinge tube and a second set of hinge mounts in a second orientation, the second orientation opposite the first orientation when the one or more hinge mounts are in the stowed configuration, distributed along the second hinge tube.

15. A solar generation system configured for attaching to a cargo container, the cargo container having a top, a bottom, and four sides, the system comprising:
  a base frame configured to extend over the top of the cargo container and configured to support one or more solar arrays, the base frame comprising one or more hinge tubes, the one or more solar arrays including one or more rotating solar arrays rotatably coupled to the base frame via the one or more hinge tubes, wherein each individual rotating solar array is configured to rotate about one of the one or more hinge tubes between a stowed position and a deployed position, wherein the one or more solar arrays include one or more stationary solar arrays configured to lie flat on top of the base frame when in the stowed position, and wherein at least one of one or more solar panels of the one or more solar arrays are exposed to sunlight when in the deployed position; and
  one or more actuation assemblies configured to attach to the base frame and to extend along one side of the four sides of the container, the one or more actuation assemblies configured to rotate the one or more rotating solar arrays between the deployed position and the stowed position, each actuation assembly comprising:
    an actuator arm configured to extend linearly along the side of the container; and
    a lever arm connected to the actuator arm at a pivot point at a first end and attached to one or more of the one or more rotating solar arrays at a second end, wherein the pivot point moves linearly in response to linear extension of the actuator arm, and wherein the lever arm is located above the one or more rotating solar arrays and above the top of the container when the one or more rotating solar arrays are in the stowed position.

16. The system of claim 15, wherein, to rotate one of the one or more rotating solar arrays from the stowed position to an initial angular position, the actuator is configured to apply an upward force on the one of the one or more rotating solar arrays through the lever arm, and
  wherein, to rotate the one of the one or more rotating solar arrays from the initial angular position to the deployed position, the actuator is configured to apply a downward force on the one of the one or more rotating solar arrays through the lever arm.

17. The system of claim 15, wherein at least one of the one or more solar arrays lie flat on top of the base frame in the deployed position.

18. The system of claim 15, wherein the cargo container is a standard intermodal shipping container.

19. The system of claim 18, wherein the base frame has a length that matches a length of the standard intermodal shipping containers, wherein the standard shipping containers may have a length of from about 10 feet to 40 feet.

20. The system of claim 15, wherein an overall height of the base frame and the solar arrays in the stowed position is not greater than 12 inches.

* * * * *